US006678616B1

(12) United States Patent
Winkler et al.

(10) Patent No.: US 6,678,616 B1
(45) Date of Patent: Jan. 13, 2004

(54) METHOD AND TOOL FOR PRODUCING A FORMATION VELOCITY IMAGE DATA SET

(75) Inventors: Kenneth W. Winkler, Ridgefield, CT (US); Ralph M. D'Angelo, New Fairfield, CT (US)

(73) Assignee: Schlumberger Technology Corporation, Ridgefield, CT (US)

(*) Notice: Subject to any disclaimer, the term of this patent is extended or adjusted under 35 U.S.C. 154(b) by 0 days.

(21) Appl. No.: 09/434,694

(22) Filed: Nov. 5, 1999

(51) Int. Cl.$^7$ .................................................. G01V 1/00
(52) U.S. Cl. .......................................... 702/6; 181/104
(58) Field of Search .................. 702/6, 10; 181/105, 181/104, 106; 367/31, 75, 35, 86; 166/4; 706/49; 703/10

(56) References Cited

U.S. PATENT DOCUMENTS

| | | | | |
|---|---|---|---|---|
| 3,205,941 A | * | 9/1965 | Walker | 166/4 |
| 3,859,851 A | | 1/1975 | Urbanosky | 73/155 |
| 3,949,352 A | | 4/1976 | Vogel | 340/15.5 |
| 4,468,623 A | | 8/1984 | Gianzero et al. | 324/367 |
| 4,834,209 A | * | 5/1989 | Vogel et al. | 181/105 |
| 4,860,581 A | | 8/1989 | Zimmerman et al. | 73/155 |
| 4,918,669 A | | 4/1990 | Chemali et al. | 367/27 |
| 4,936,139 A | | 6/1990 | Zimmerman et al. | 73/155 |
| 5,058,078 A | | 10/1991 | Eyl et al. | 367/26 |
| 5,164,548 A | | 11/1992 | Angehrn | 181/103 |

(List continued on next page.)

FOREIGN PATENT DOCUMENTS

WO   WO 99/35490   7/1999   .......... G01N/29/10

OTHER PUBLICATIONS

Anderson, Don L. et al. *The Effect of Oriented Cracks on Seismic Velocities.* Journal of Geophysical Research. vol. 79, No. 26 (Sep. 10, 1974) pp. 4011–4015.

Nur, Amos. *Effects of Stress on Velocity Anistrophy in Rocks with Cracks.* Journal of Geophysical Research. vol. 76, No. 8 (Mar. 10, 1971) pp. 2022–2034.

Winkler, Kenneth W. *Azimuthal Velocity Variations Caused by Borehole Stress Concentrations.* Journal of Geophysical Research. vol. 101, No. B4 (Apr. 10, 1996) pp. 8615–8621.

Winkler, Kenneth W. *Acoustic Evidence of Mechanical Damage Surrounding Stressed Boreholes.* Geophysics. vol. 62, No. 1 (Jan.–Feb. 1977) pp. 16–22.

Plona et al. *Measurement of Stress Direction and Mechanical Damage Around Stressed Boreholes Using Dipole and Microsonic Techniques.* SPE/ISRM 47234. Proceedings of the 1998 SPR/ISRM Rock Mechanics in Petroleum Engineering, Eurock, Part 1 of 2, Trondheim, Norway (Jul. 8–10, 1998) pp. 123–129.

Primary Examiner—John Barlow
Assistant Examiner—Victor J. Taylor
(74) Attorney, Agent, or Firm—John L. Lee; William B. Batzer; John J. Ryberg

(57) ABSTRACT

Methods and tools are provided for real time velocity imaging of a borehole wall with sufficiently high resolution to identify vugs, worm holes, thin beds, dip angles, fractures and breakouts, for both open hole logging and logging while drilling in the presence of OBM's. A method is provided which includes transmitting an ultrasonic pulse through the borehole wall, receiving at first and second spaced-apart receivers an ultrasonic pulse refracted from the borehole wall, and producing a velocity image data value indicative of difference of arrival times at first and second spaced-apart receivers. This is repeated at a plurality of azimuths and depths to produce a velocity image data set. The method uses compressional pulses and/or pseudo-Raleigh pulses.

A tool is provided for wireline use having an ultrasonic transmitter for transmitting ultrasonic pulses into the borehole wall, and a plurality of ultrasonic receivers. A processor in the tool produces real time velocity image data values indicative of time of flight of an ultrasonic pulse in the borehole wall. A similar tool is provided for logging while drilling (LWD).

78 Claims, 26 Drawing Sheets

U.S. PATENT DOCUMENTS

| | | | |
|---|---|---|---|
| 5,463,320 A | | 10/1995 | Bonner et al. ............... 324/366 |
| 5,521,882 A | * | 5/1996 | D'Angelo et al. ............ 367/32 |
| 5,544,127 A | * | 8/1996 | Winkler et al. ............... 367/27 |
| 5,594,706 A | | 1/1997 | Shenoy et al. ................ 367/76 |
| 5,678,643 A | * | 10/1997 | Robbins et al. ............... 175/45 |
| 5,796,677 A | | 8/1998 | Kostek et al. ................ 367/25 |
| 5,886,303 A | | 3/1999 | Rodney ....................... 181/102 |
| 5,899,958 A | * | 5/1999 | Dowell et al. ................ 702/6 |
| 6,098,021 A | * | 8/2000 | Tang et al. ................... 702/14 |
| 6,510,389 B1 | * | 1/2003 | Winkler et al. ................ 702/6 |

\* cited by examiner

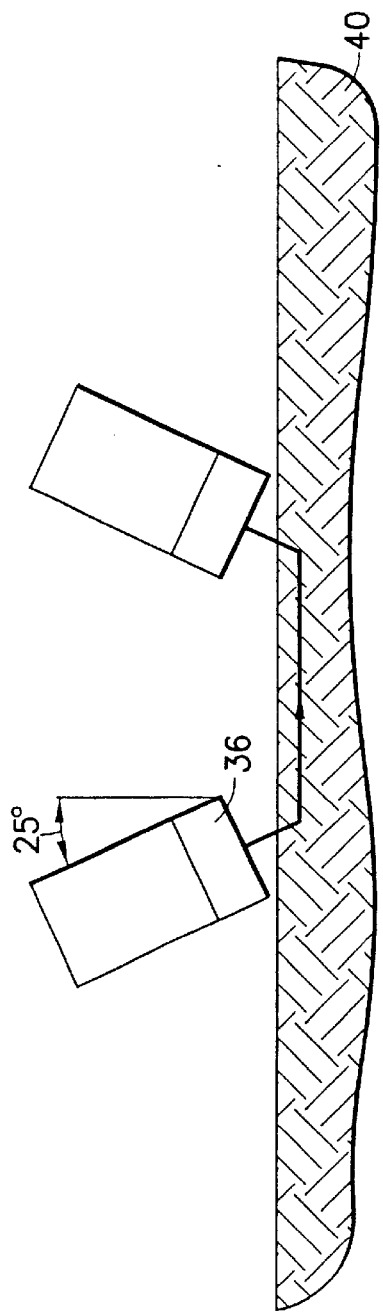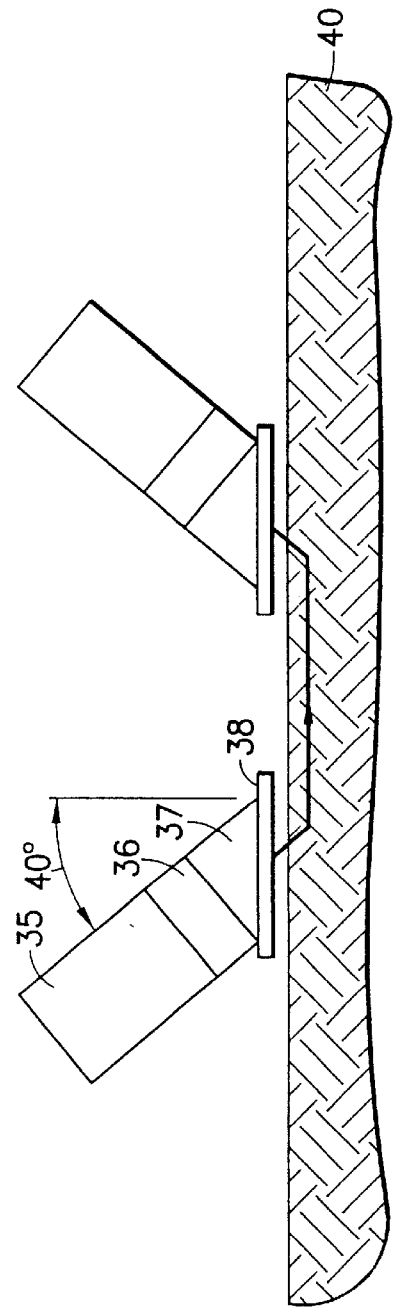

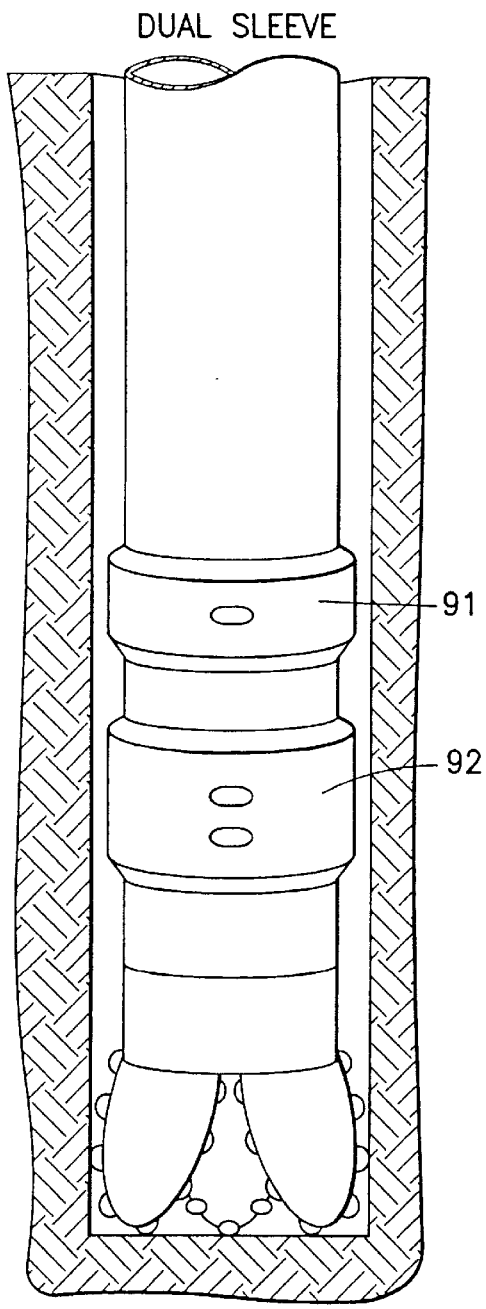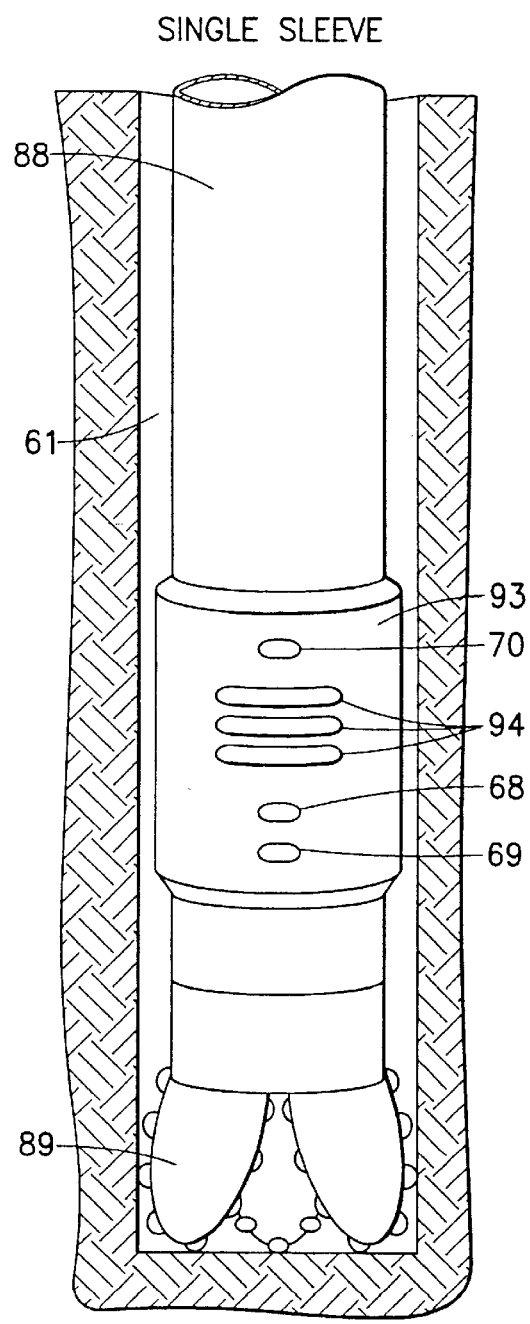
FIG.13
FIG.14

0 MPa

5 MPa

10 MPa

15 MPa

METHOD AND TOOL FOR PRODUCING A FORMATION VELOCITY IMAGE DATA SET

FIELD OF THE INVENTION

This invention relates broadly to methods and tools for measuring formation geomechanical parameters as a function of both depth and azimuth, whereby features of the formation are determined and imaged.

BACKGROUND OF THE INVENTION

The art of sonic well logging for use in determining formation parameters is a well established art. Sonic well logs are typically derived from sonic tools suspended in a mud-filled borehole by a cable. The tools typically include a sonic source (transmitter) and a plurality of receivers which are spaced apart by several inches or feet. Typically, a sonic signal is transmitted from the transmitter at one longitudinal end of the tool and received by the receivers at the other, and measurements are made every few inches as the tool is drawn up the borehole. The sonic signal from the transmitter or source enters the formation adjacent the borehole, and the arrival times of the compressional (P-wave), shear (S-wave) and Stoneley (tube) waves are detected by the receivers. The receiver responses are typically processed in order to provide a time to depth conversion capability for seismic studies as well as for providing the determinations of formations parameters such as porosity. It has long been known that the drilling of a borehole into a formation disturbs the stress field that was present in the formation prior to the existence of the borehole. The drilling of the borehole results in circumferential and radial stress concentrations around the borehole, where the resulting stress field is strongly anisotropic at the borehole wall, but the effects of the borehole decrease rapidly with distance into the formation. It has also been established that acoustic velocities in rock are sensitive to applied stress, with both compressional and shear velocities increasing with hydrostatic stress. Uniaxial stress produces compressional and shear wave anisotropy and shear wave birefringence (velocity dependent on polarization). These results have been related by A. Nur, "Effects of Stress on Velocity Anisotropy in Rocks with Cracks", Journal Geophysics. Res.; Vol. 76, 8, p. 2022 (1971), and by D. L. Anderson et al., "The Effect of Oriented Cracks on Seismic Velocities", Journal Geophysics Res.; Vol. 82 p.5374 (1974), to stress-induced anisotropy of microcrack orientations. U.S. Pat. No. 5,544,127, issued Aug. 6, 1996, to Winkler, a co-inventor of the present invention, discloses the use of a sonic borehole tool to measure velocity around the borehole as a function of azimuth. In this patent Winkler teaches that formation properties can be determined from a knowledge of velocity as a function of azimuth, and that the azimuthal direction of minimum velocity around the borehole predicts the propagation direction of artifically induced hydrofractures. He further teaches that sonic velocity variation around the borehole at a particular depth of the borehole may be taken as an indication of susceptibility to failure, with higher velocity variations indicative of a more poorly consolidated formation or a formation with a large uniaxial stress. He further teaches that the curvature of the velocity versus stress curve in the formation is indicated by how poorly a sine wave fits to the velocity data. He further teaches that other parameters of the formation may be obtained by fitting a best fit curve to the azimuth versus velocity data, where adjustable parameters of the best fit curve constitute the formation parameters. Compared to alternative techniques using resistivity measurements, the resolution of sonic techniques is poor. Despite the knowledge which has been accumulated over the years regarding stress fields in formations around a borehole, sonic borehole tools having never been used to capture data of sufficiently high resolution for useful velocity imaging of the borehole wall, or to provide real time indications of thin beds, fractures and vugs as a function of depth and azimuth.

The art of resistance measurement well logging for use in determining formation parameters is also a well established art. The use of resistive measurements is discussed in U.S. Pat. No. 5,463,320, issued Oct. 31, 1995, to Bonner et al. Bonner discloses a logging tool for use in determining the resistivity of an underground formation surrounding a borehole. The tool comprises a mandrel with two transmitters spaced apart thereon, each serving to establish a current in the mandrel and in the underground formation. A series of electrodes are spaced along the body between the transmitters and sensors, located at each electrode, measure radial current flow along a path from the mandrel to the underground formation via a respective electrode. Sensors also provide the axial current flowing along the whole mandrel and at positions corresponding to each electrode. A method of determining the formation resistivity includes the steps of measuring the radial currents $R_1$ $R_2$ from the mandrel to the formation via each electrode and obtaining the axial current $M_{01}$ $M_{02}$ along the mandrel at each electrode due to each transmitter; measuring the total axial current $M_{12}$ along the mandrel from the first or second transmitter and deriving the resistivity of the formation from the radial focused current $R_c$ for each electrode according to the relationship $R_c=1/M_{21}$ ($M_{02}R_1+M_{01}R_2$). However, the resistivity technique does not work in the presence of high-resistivity fluids such as oil-based drilling muds. (OBM's) as often present in LWD operations, or high-resistivity borehole fluid as often present in wireline operations.

It is therefore an object of the invention to provide methods and tools for producing formation velocity image data at a sufficiently high resolution to identify vugs, worm holes, thin beds, dip angles, fractures, breakouts, and rifling (drilling-induced coherent roughness). It is a further object of the invention to provide tools and methods for producing formation velocity image data in the presence of high-resistivity fluids, including oil-based drilling muds (OBM's).

It is a further object of the invention to produce a velocity image data set so as to provide real time velocity images of formation surrounding a borehole while drilling as well as during open hole logging.

SUMMARY OF THE INVENTION

In accordance with the objects of the invention, the invention provides methods and tools for real time velocity imaging of a borehole wall with sufficiently high resolution to identify vugs worm holes, thin beds, dip angles, fractures, breakouts, and rifling (drilling-induced coherent roughness), for both open hole logging and logging while drilling in the presence of OBM's.

The present invention provides a method for velocity imaging a borehole wall by measuring an ultrasonic velocity in a portion of a borehole wall at a plurality of azimuths and depths to produce a velocity value at each of the plurality of azimuths and depths, and using the velocity values as a two-dimensional image data set. Measuring a velocity value includes dividing receiver spacing by difference of arrival times of an ultrasonic pulse refracted from the borehole wall at first and second spaced-apart receivers.

The present invention provides a method for velocity imaging a borehole wall by transmitting an ultrasonic pulse through the borehole wall, receiving at a receiver an ultrasonic pulse refracted from the borehole wall, and producing velocity image data values indicative of a time of flight of an ultrasonic pulse between transmitter and receiver at a plurality of azimuths and depths to produce a velocity image data set.

A preferred embodiment of the method for producing a velocity image data set according to the present invention includes the steps of: a) transmitting an ultrasonic pulse through the borehole wall; b) receiving at first and second spaced-apart receivers an ultrasonic pulse refracted from the borehole wall; c) producing a velocity image data value indicative of difference of arrival times at first and second spaced-apart receivers; d) repeating steps a)–c) at a plurality of azimuths to produce a velocity image data value at each of the plurality of azimuths; and e) repeating steps a)–d) at a plurality of depths to produce an image data set.

Step (c) includes producing a velocity image data value by dividing receiver spacing by difference of arrival times. It also includes determining a compressional pulse arrival time by digitizing a signal from a receiver, determining noise level, setting a compressional amplitude threshold to be a multiple of the noise level, determining compressional amplitude threshold time as time at which an absolute value of the signal exceeds the threshold for compressional pulse, picking the first zero-crossing after threshold time, and setting compressional pulse arrival time equal to the time of first zero-crossing. It also includes the step of determining a pseudo-Raleigh pulse arrival time by setting a pseudo-Raleigh amplitude threshold to be a multiple of the larger of the first two extrema of signal following the first zero-crossing, determining pseudo-Raleigh amplitude threshold time as time at which an absolute value of the signal exceeds the threshold for pseudo-Raleigh pulse, picking the first zero-crossing after pseudo-Raleigh threshold time, and setting pseudo-Raleigh pulse arrival time equal to the time of first zero-crossing. It also includes the step of associating the velocity image data value derived from the compressional pulse arrival time with a compressional velocity image data set and associating the velocity image data value derived from the pseudo-Raleigh pulse arrival with a pseudo-Raleigh velocity image data set. It also includes the step of calculating a correction factor to correct for error in effective spacing between receivers according to critical angle and formation velocity.

Basic Embodiment of the Tool

The present invention provides a tool for producing a velocity image data set representing formation surrounding a borehole. In a basic embodiment, the tool includes an elongate body that is moveable through the borehole; an ultrasonic transmitter attached to the elongate body for transmitting pulses of ultrasonic waves in the frequency range 50–500 kHz into the borehole wall; at least one ultrasonic receiver, attached to the elongate body and spaced apart from the transmitter, for receiving refracted ultrasonic pulses from the borehole wall; and a processor, coupled to the ultrasonic receiver for producing velocity image data values indicative of time of flight of an ultrasonic pulse.

An alternative embodiment uses a single transmitter and a single receiver to produces a velocity image data value indicative of time of flight between transmitter and receiver.

First Preferred Embodiment of the Tool

A first preferred embodiment of the tool of the present invention is a wireline tool for real time velocity imaging of a borehole wall. The wireline tool includes an elongated body adapted for suspension from a wireline; an ultrasonic transmitter attached to the elongate body for transmitting ultrasonic pulses into the borehole wall; a plurality of pairs of azimuthally aligned pairs of receivers located at azimuthal intervals around the elongate body, each pair of receivers including first and second spaced-apart receivers; and a processor coupled to receive signals from a pair of receivers; the processor having means for producing a velocity image data value indicative of difference of arrival times at first and second spaced-apart receivers.

The processor further includes means for associating a difference of arrival times with a specific pair of first and second spaced-apart receivers such as to produce velocity image data values as a function of azimuth; means for associating a depth with each difference of arrival times such as to produce velocity image data values as a function of azimuth and depth; means for adding velocity image data values to a stored velocity image data set; means for identifying an arrival as a compressional pulse arrival or as a pseudo-Raleigh pulse arrival; means for determining a difference of arrival times at the first and second spaced-apart receivers; means for dividing spacing between first and second receivers by difference of arrival times; means for first motion detection; and means for first zero crossing detection.

Second Preferred Embodiment of the Tool

A second preferred embodiment of the tool of the present invention is an LWD tool for real time velocity imaging of a borehole wall while drilling. The LWD tool includes an elongated body which is a portion of drill string proximate to a drill bit; an ultrasonic transmitter attached to the elongate body for transmitting ultrasonic pulses into the borehole wall; a pair of first and second spaced-apart receivers attached to the elongate body for receiving refracted ultrasonic pulses from the borehole wall; and a processor coupled to the ultrasonic receiver for producing velocity image data values indicative of time difference of arrival times at first and second spaced-apart receivers.

The second preferred embodiment, the LWD tool, further comprises a mud pulse data transmitter for transmitting velocity image data values to the surface station; a transmitter mount for attaching the transmitter to the drill string; and a receiver mount for attaching the pair of receivers to the drill string. The receiver mount is sized to minimize standoff of the pair of receivers from the borehole wall.

The processor of the second preferred embodiment includes means for associating a difference of arrival times with an azimuthal position of first and second spaced-apart receivers such as to produce a series of velocity image data values with an azimuthal position attribute as the drill string rotates in the borehole; means for associating a difference of arrival times with a depth such as to produce a velocity image data value with an azimuthal position attribute and a depth attribute; means for adding velocity image data values to a stored velocity image data set; means for identifying an arrival as a compressional pulse arrival; means for first motion detection; means for identifying an arrival as a pseudo-Raleigh pulse arrival; means for first zero crossing detection; means for determining a difference of arrival times at the first and second spaced-apart receivers; and means for dividing receiver spacing by difference of arrival times at the first and second spaced-apart receivers.

The receiver of the second preferred embodiment is a directionally sensitive receiver oriented at 25 degrees to the drill string axis.

The transmitter of the second preferred embodiment is a directional transducer for generating directional pulses of ultrasonic waves in the frequency range 50–500 kHz. The transmitter is oriented at an angle to the drill string axis such that ultrasonic compressional waves propagate toward the receiver along a portion of the borehole wall longitudinally with respect to the borehole. The angle is selected to optimize for compressional waves.

BRIEF DESCRIPTION OF THE DRAWINGS

FIGS. 1–8B illustrate a preferred embodiment of a method in accordance with the present invention.

FIG. 1 is a flowchart of the method of the invention using a pair of receivers.

FIG. 3 is a flowchart of step 105 of the method of FIG. 1 as applied in wireline application.

FIG. 4 is a flowchart of step 105 of the method of FIG. 1 as applied in LWD application.

FIG. 5 is an ultrasonic waveform as received at a receiver showing both compressional and pseudo-Raleigh waves.

FIG. 6 shows the angle of incidence of a transmitter to the borehole wall.

FIGS. 8A and 8B illustrate the ray-path situation with receiver standoff from the borehole wall, small and large offset respectively.

FIGS. 9A, 9C, and 10D illustrate a preferred embodiment of a wireline tool in accordance with the present invention.

FIG. 9A is a cross section of the preferred embodiment of a wireline pad showing the one transmitter and one of several pairs of receivers.

FIG. 9B shows the refracted wave path in an embodiment having a transmitter element without a coupling wedge, the transmitter element angled at 25°.

FIG. 9C shows the refracted wave path in the preferred embodiment having a transmitter element with a coupling wedge, the transmitter element angled at 40°.

FIGS. 10A–10D show arrangements of receiver pairs on a wireline pad in relation to the transmitter.

FIGS. 11–16 illustrate a preferred embodiment of an LWD tool.

FIG. 11 is an elevation view of a first embodiment of an LWD tool having one transmitter and one spaced-apart pair of receivers.

FIG. 12 is a partial cross-section view of the LWD tool of FIG. 11.

FIG. 13 is an elevation view of an LWD tool having dual sleeves.

FIG. 14 is an elevation view of a preferred embodiment of an LWD tool having a single sleeve and sleeve slots.

FIG. 15 is an elevation view of an LWD tool having a single sleeve, sleeve slots and dual transmitters.

FIG. 16 is an elevation view of an LWD tool having a single sleeve, sleeve slots and multiple transmitters.

FIGS. 18–23H show test equipment and test results from testing the present invention.

FIG. 18 is a schematic perspective view of an experimental tool used in testing the concepts of the invention.

FIG. 19 is a velocity image of a layered cement sample, the image made from measurements using the experimental tool.

FIG. 20 is a set of raw delta-time scans made over a layered cement sample, each scan made at a different standoff, using the experimental tool.

FIG. 21 is a set of azimuthal velocity profiles of Copper Massillon Sandstone, using the experimental tool.

FIGS. 23A–23H is a set of borehole velocity images of Copper Massillon Sandstone with stress effects processed out.

DETAILED DESCRIPTION OF THE INVENTION

General

The present invention addresses the need for velocity imaging of a borehole wall at a sufficiently high resolution to identify vugs, worm holes, thin beds, dip angles, fractures, breakouts, and rifling (drilling-induced coherent roughness); for producing a velocity image data set in the presence of oil-based drilling muds; and for providing real time velocity images of a borehole wall while drilling as well as during open hole logging.

Method of the Invention

Figure 1:
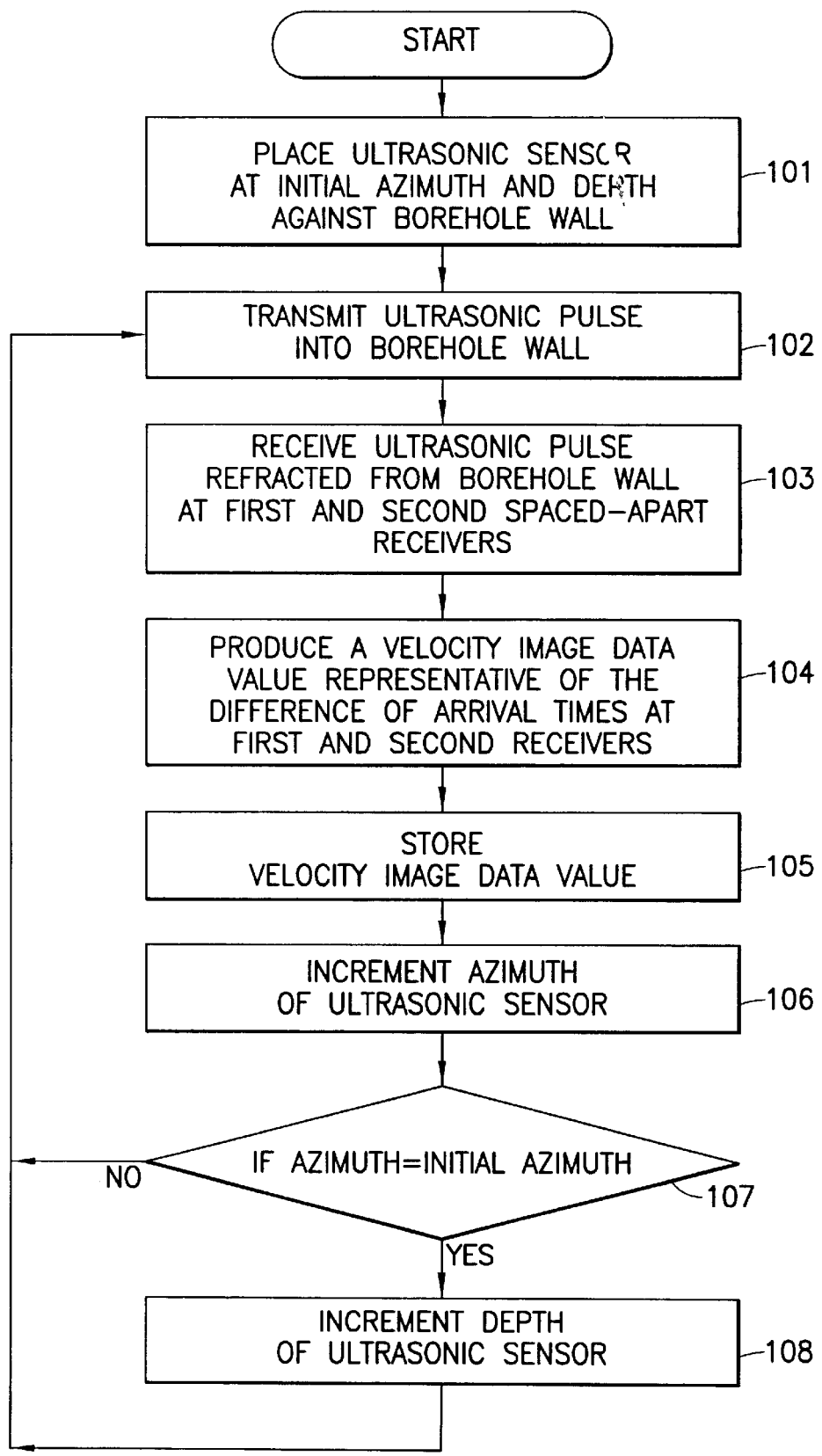
Figure 2A:
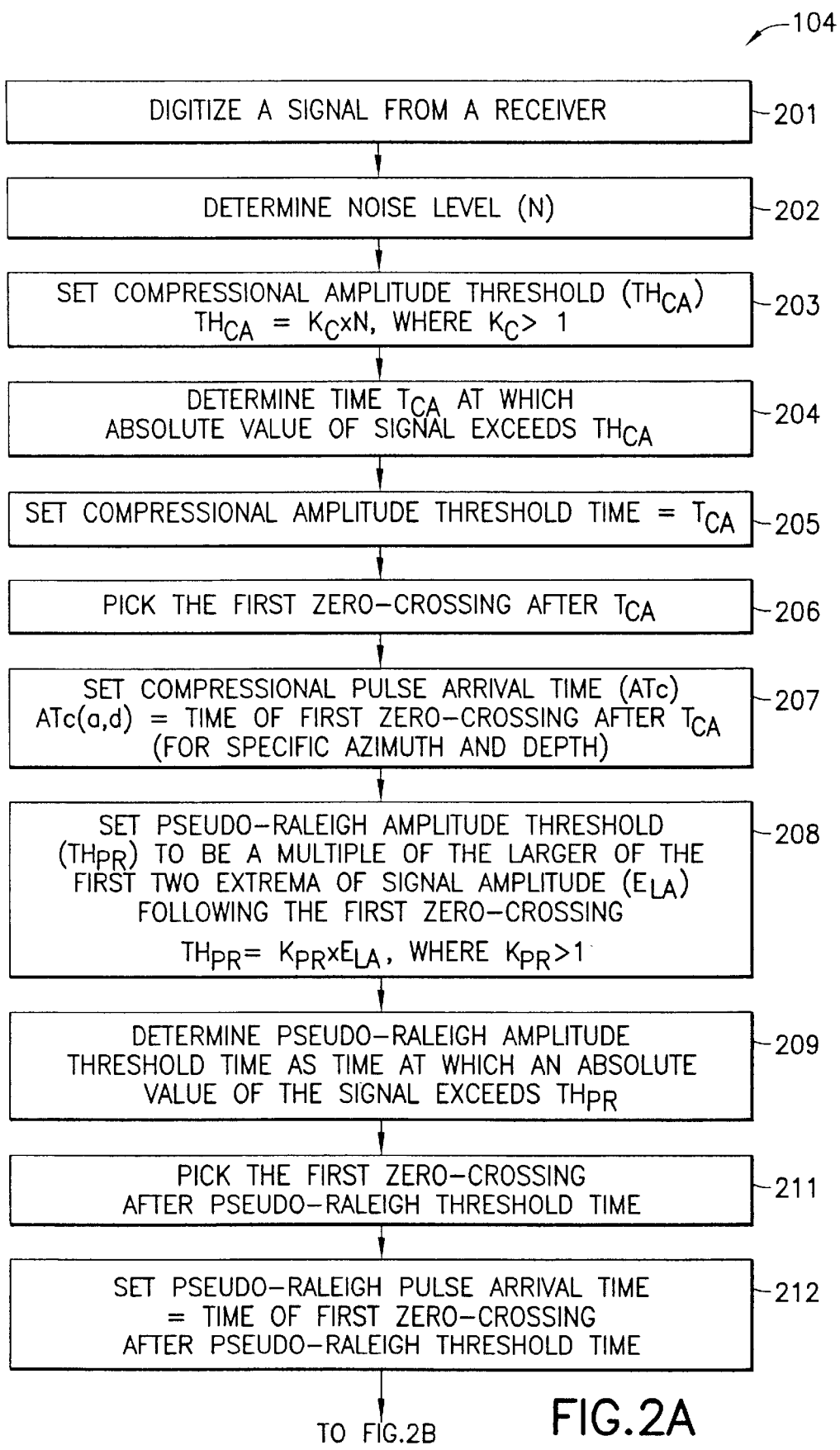
FIG. 2A is a flowchart of a first portion of step 104 of the method of FIG. 1.
Figure 2B:
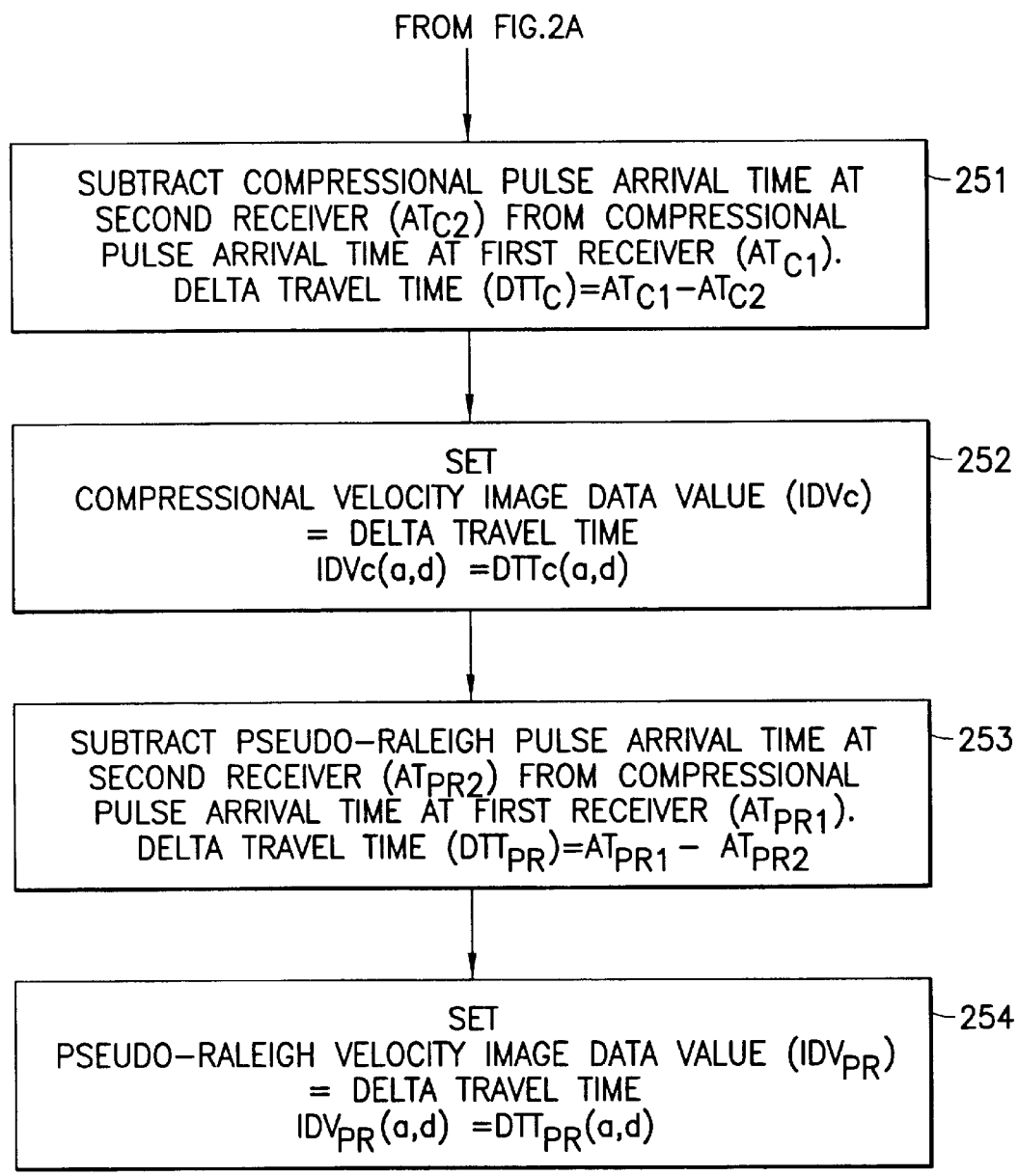
FIG. 2B is a flowchart of a second portion of step 104 of the method of FIG. 1.
Figure 3:
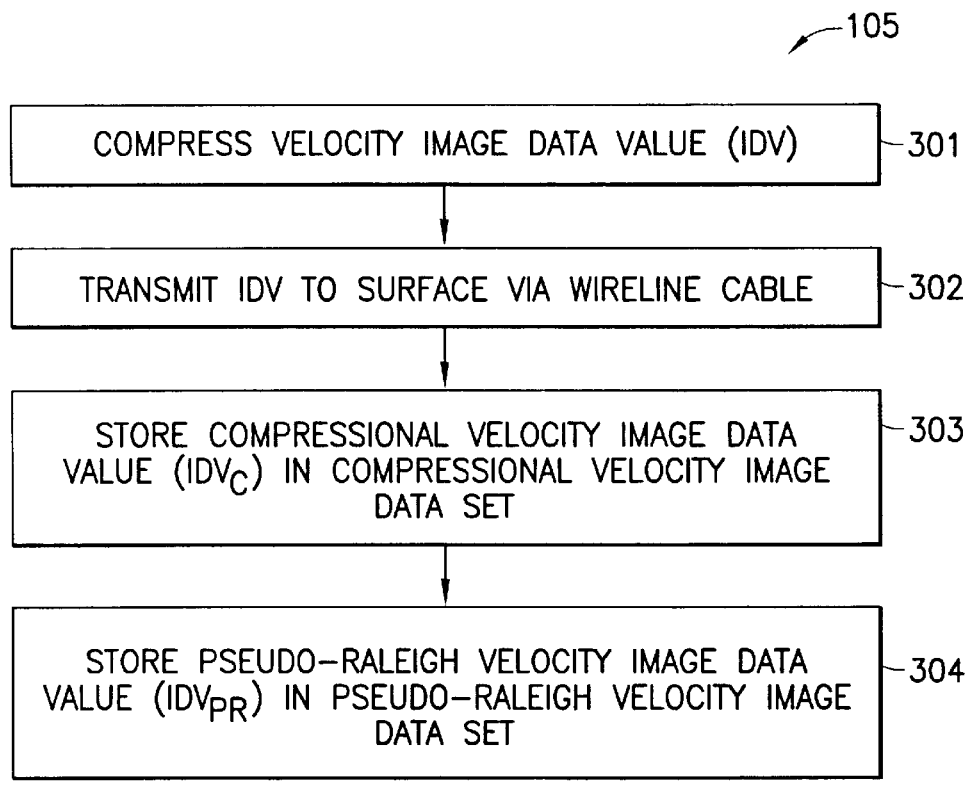
Figure 4:
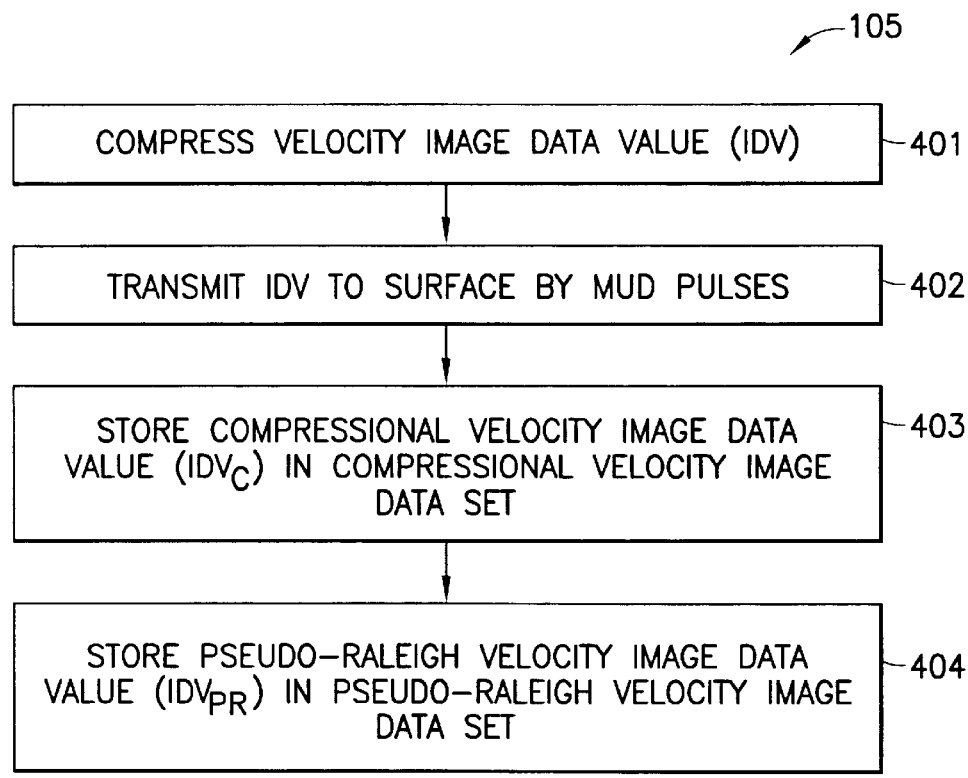

The steps of a preferred embodiment of the method of the present invention are listed in the flowcharts of FIGS. 1–4. FIG. 1 illustrates the method as a whole having eight steps: 101–108. FIG. 2A expands a first portion of step 104. FIG. 2B expands a second portion of step 104. FIG. 3 expands step 105 as applied to wire line logging. FIG. 4 expands step 104 as applied to LWD.

One cycle through steps 101–107 of FIG. 1 produces a single velocity image data value at a specific depth and azimuth.

Each subsequent cycle at the same depth produces another velocity image data value at a different azimuth until velocity image data values at a series of azimuthal positions at that depth have been produced. After incrementing depth, this process is repeated at the new depth. The process is repeated at a series of depths to generate a velocity image data set indicative of a two dimensional image of the borehole wall.

An ultrasonic pulse transmitted into the borehole wall produces compressional and pseudo-Raleigh waves that arrive sequentially at the receiver after being refracted from the surface of the borehole wall. The waveform as seen at the receiver is shown in FIG. 5.

A velocity image data value is a velocity produced by dividing receiver spacing by difference of arrival times (delta-t) at the two receivers to yield apparent velocity (meters/second). A difference of arrival times is computed for each arrival of the same ultrasonic pulse traveling in the same mode (e.g. compressional or pseudo-Raleigh), that appears at both receivers.

The method includes identifying an arrival as a compressional pulse arrival or pseudo-Raleigh pulse arrival and then determining the arrival time.

Figure 5:
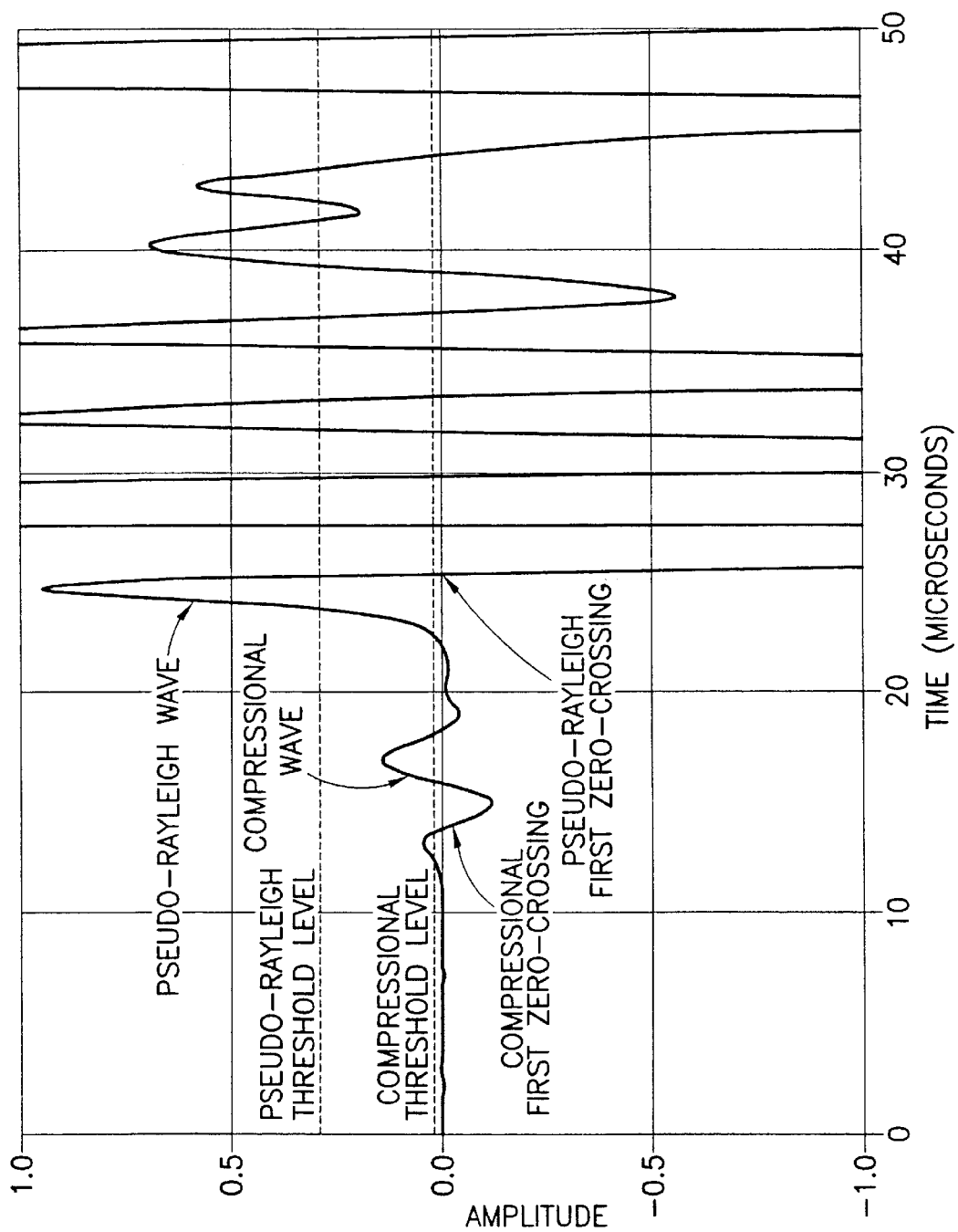
Figure 6:
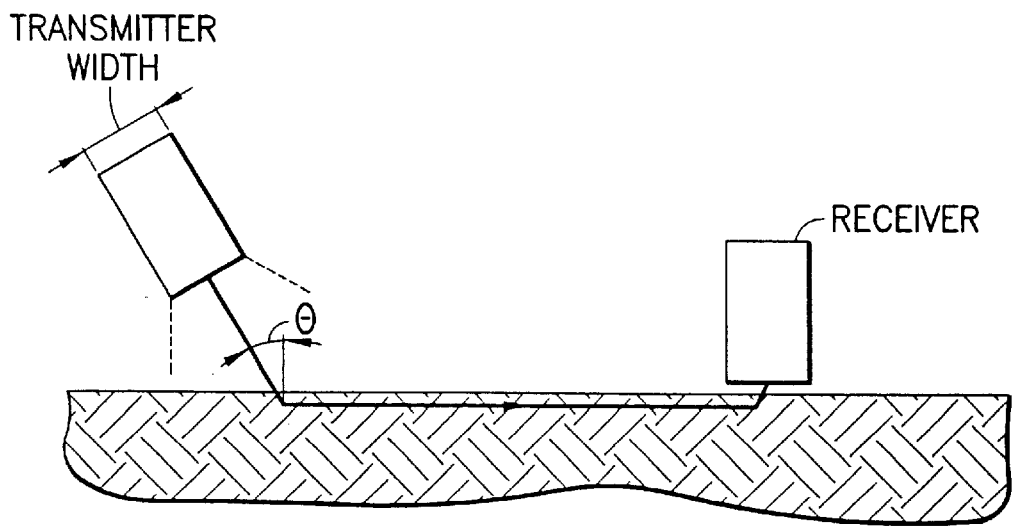

Since the compressional pulse always arrives first (as illustrated in FIG. 5), this fact is used to identify the compressional pulse arrival and to determine the compressional pulse arrival time. The compressional pulse arrival is identified by digitizing a signal from a receiver, determining noise level, setting a compressional amplitude threshold to be a multiple of the noise level, determining compressional amplitude threshold time as time at which an absolute value of the signal exceeds the threshold for compressional pulse, and picking the first zero-crossing after threshold time. The compressional pulse arrival time is determined by setting compressional pulse arrival time equal to the time of first zero-crossing.

The preferred embodiment detects an arrival by detecting arrival time of a pulse using first motion detection and zero crossing straight line approximation. Of course, other means of detecting arrival times could be used, for example first breaks.

The pseudo-Raleigh pulse arrival is identified by setting a pseudo-Raleigh amplitude threshold to be a multiple of the larger of the first two extrema of signal following the first zero-crossing, determining pseudo-Raleigh amplitude threshold time as time at which an absolute value of the signal exceeds the threshold for pseudo-Raleigh pulse, and picking the first zero-crossing after pseudo-Raleigh threshold time. The pseudo-Raleigh pulse arrival time is determined by setting pseudo-Raleigh pulse arrival time equal to the time of first zero-crossing.

To determine the time of a zero-crossing—in which a waveform crosses the zero-level—a computer interpolates between data points that bracket the horizontal axis).

The velocity image data value derived from the compressional pulse arrival time is associated with a compressional image data set. The velocity image data value derived from the pseudo-Raleigh pulse arrival is associated with a pseudo-Raleigh image data set.

Data indicative of a borehole image data set is sent uphole for processing and display.

Following standard practice, the digitizing sample rate should be set at least twice as high as the highest frequency that one is interested in recording. For ultrasonic imaging, a sample rate of one megahertz is generally adequate. It is also recommended to apply a low-pass anti-aliasing filter to exclude frequencies above those expected in the acoustic signal (typically 500 kHz, for example).

The digitizer begins recording shortly after the transmitter fires, and begins acquiring data approximately 10 microseconds before the compressional wave arrival time. This allows time for analysis of the noise level. Noise level is determined by using the digitally recorded waveform of the early part of the waveform, i.e. before the first acoustic signal arrives, to calculating average amplitude.

The digitizers should have a sufficient number of bit-levels (512 or greater) to accurately record the waveform. Amplifiers are adjusted so that the compressional wave amplitude is at least 10 percent of the maximum level the digitizer can record.

The time interval between transmitter firings should be set so that the tool has moved by just the right distance for optimum image resolution. For wireline applications this will be determined by the logging speed. For LWD applications this will be determined by the rotation speed of the drill collar. In either case this would be less than the 100 firings per second that is typical of laboratory measurements.

Although digital data acquisition is preferred for making arrival time measurements, analog techniques could be used.

The preferred embodiment of the method of the invention should work well for good-quality waveforms as shown in FIG. 5. It may be modified somewhat to deal with lower-quality waveforms, such as by using different definitions of the threshold levels.

In most types of rock the pseudo-Rayleigh waves are stronger than the compressional waves. In other types of rock pseudo-Rayleigh waves are not produced at all. To address these situations, it would be useful to be able to select either compressional waves or pseudo-Rayleigh waves for imaging, selecting whichever gives the clearer signal. This capability can be provided by software in the processor. Having this capability relaxes the requirement for the tool to have to detect strong compressional arrivals in all formations of interest. Also, in cases where both compressional waves and pseudo-Rayleigh waves are available for imaging, it would be valuable to record both images. The pseudo-Rayleigh image and the compressional image are images of different properties.

In FIG. 2A, step 203, the threshold level is preferably set to be twice the average noise level, i.e.:

Calculate $TH_{CA}=K_C \times N$, where $K_C=2$.

In FIG. 2A, step 205 includes setting the compressional pulse arrival time as being the time at which the absolute value of the acoustic signal first exceeds the threshold level.

In FIG. 2A, step 206, picking the first zero-crossing, includes determining the first time following the threshold time at which the waveform crosses the zero-level.

In FIG. 2A, step 207, determining the compressional-wave arrival time includes determining the time at which the acoustic signal first exceeds the compressional-wave threshold level.

In FIG. 2A, step 208, setting the pseudo-Rayleigh amplitude threshold level $TH_{PR}$, includes finding the absolute values of the first two extrema (peak and valley) of the waveform following the first zero-crossing, and multiplying the larger of these by $K_{PR}$, where $K_{PR}=2$.

In FIG. 2A, steps 209–212, determining the pseudo-Rayleigh arrival time, include determining the time at which the acoustic signal first exceeds the pseudo-Rayleigh threshold level.

Receiver Array Calibration and Receiver Standoff

A first concern that must be addressed when using a receiver array in accordance with the present invention is calibration of the individual elements. A second concern is receiver standoff.

Although nominally the same, receiver transducers vary in both their amplitude response and in their weighting across the transducer face.

A first-order calibration procedure assumes that each receiver pair has an error in the effective spacing between receivers. If the value used in our calculations (Dx) is one percent less than the true spacing, then the velocity (=Dx/Dt) will be one percent below the true value. We found, however, that the percent velocity error was not constant from one material to another. A calibration that works on one material may not work on another.

Figure 7A:
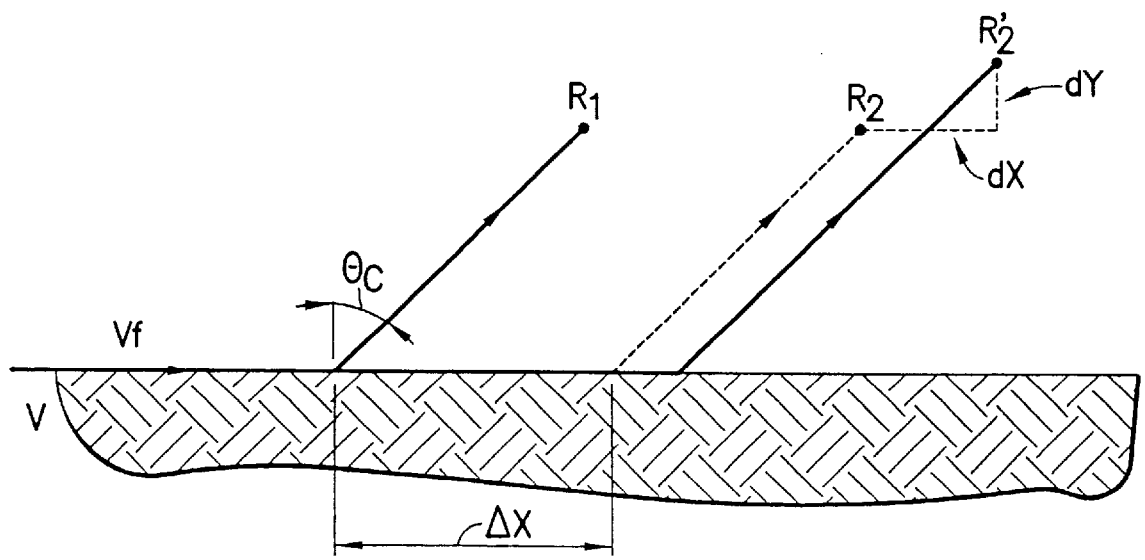
FIG. 7A displays ray-path geometry associated with receiver location position error.
Figure 7B:
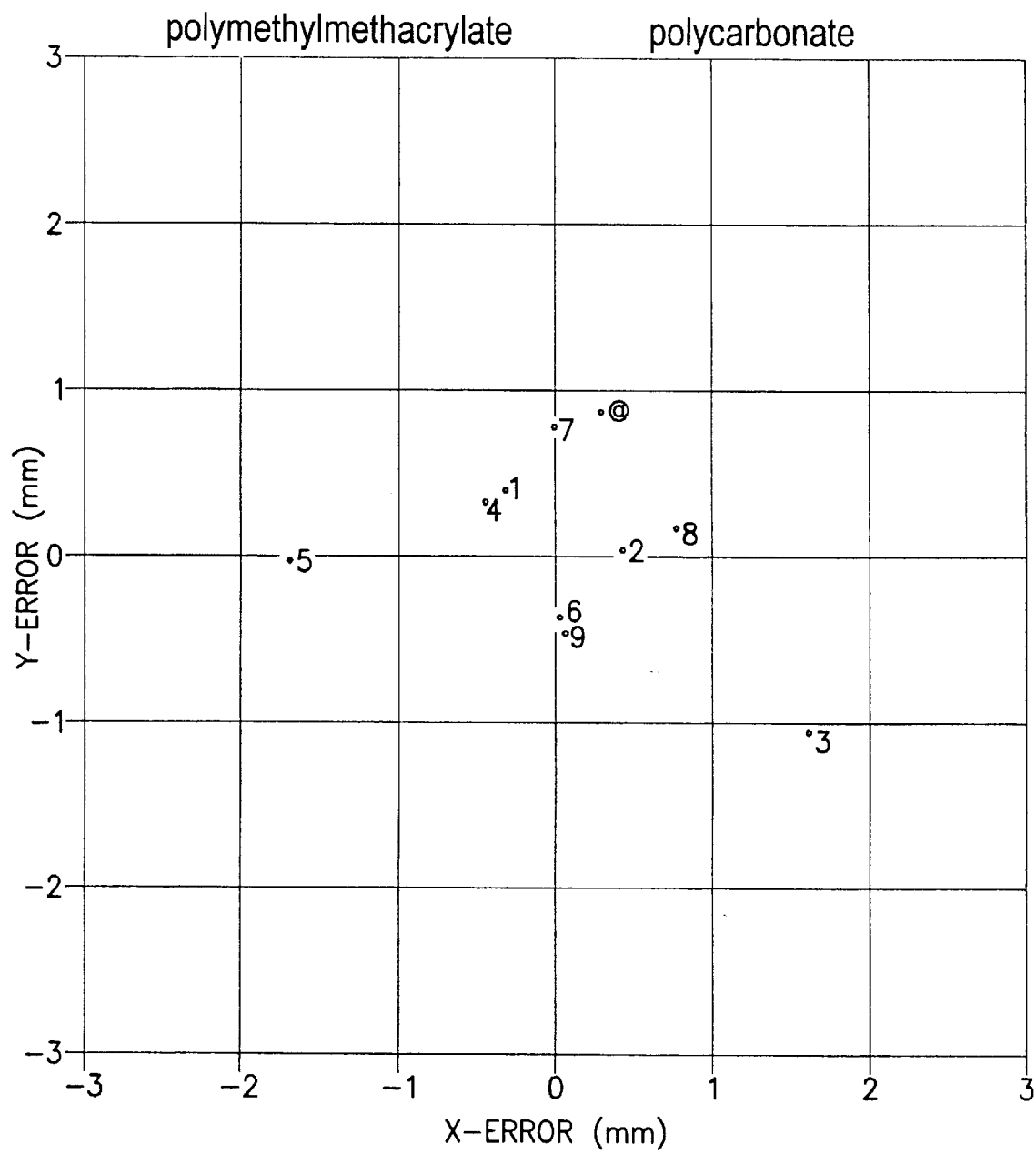
FIG. 7B displays relative position errors of multiple receiver pairs having the ray-path geometry of FIG. 7A.

A second-order calibration procedure assumes that each receiver pair has a relative location error in both x and y. This is illustrated in FIG. 7A. Relative to the near receiver at $R_1$, the far receiver was designed to be located at $R_2$, but its effective position is actually at $R_2'$. There is an error in both dx and dy. If we follow through the ray-tracing, we find that the difference in arrival times at the two receivers is given by $$\Delta t = \frac{\Delta x + dx - dy\tan\theta_c}{V} + \frac{dy}{V\sin\theta_c\cos\theta_c}, \quad (1)$$

where $\theta_c$ is the critical angle and V is the compressional velocity in the solid. This can be re-arranged to give $$V\Delta t = \Delta x + dx + dy\left[\frac{1}{\sin\theta_c\cos\theta_c} - \tan\theta_c\right] \quad (2)$$

$$V\Delta t = \Delta x + dx + dyf(\theta_c) \quad (3)$$

where $f(\theta_c)$ is the quantity in brackets. To solve for the two unknowns, dx and dy, we must make measurements over two reference samples having known velocities. This gives $$dx = V_1\Delta t_1 - \Delta x - dyf(\theta_1) \quad (4)$$

$$dy = \frac{V_1\Delta t_1 - V_2\Delta t_2}{f(\theta_1) - f(\theta_2)} \quad (5)$$

where the subscripts 1 and 2 identify the samples. With equations (4) and (5) we can solve for the location error of each receiver pair. An example is shown in FIG. 7B where we plot dy vs dx for our laboratory pad calibrated on polymethylmethacrylate and polycarbonate. For polymethylmethacrylate Vp=2.74 km/s. For polycarbonate Vp=2.17 km/s. The numbers on the plot identify the receiver pairs. Note that most errors are less than one millimeter from the expected location. The errors for receiver pairs 3 and 5 are somewhat larger. Errors in y are comparable to those in x.

After calculating dx and dy for each receiver pair, we can re-arrange Equation (3) to solve for velocity $$V = \frac{1}{\Delta t}(\Delta x + dx + dyf(\theta_c)) \quad (6)$$

where again, $$f(\theta_c) = \frac{1}{\sin\theta_c\cos\theta_c} - \tan\theta_c. \quad (7)$$

Since $\theta_c$ is a function of velocity ($\theta_c = \sin^{-1}(V_f/V)$ with $V_f$=fluid velocity), we need to simplify $f(\theta_c)$ so that V can be isolated. In Equation (7) the correction factor, $f(\theta_c)$, is plotted as a function of rock velocity, V (solid curve). We also plot a linear fit to $f(\theta_c)$ over the velocity range from 1.7 to 5.7 km/s, which covers most velocities of interest in formation evaluation. The linear fit allows us to use the approximation $$f(\theta_c) \approx -0.68 + 0.78V \quad (8)$$

which simplifies Equation (6) to $$V \approx \frac{\Delta x + dx - 0.68dy}{\Delta t - 0.78dy}. \quad (9)$$

Figure 7C:
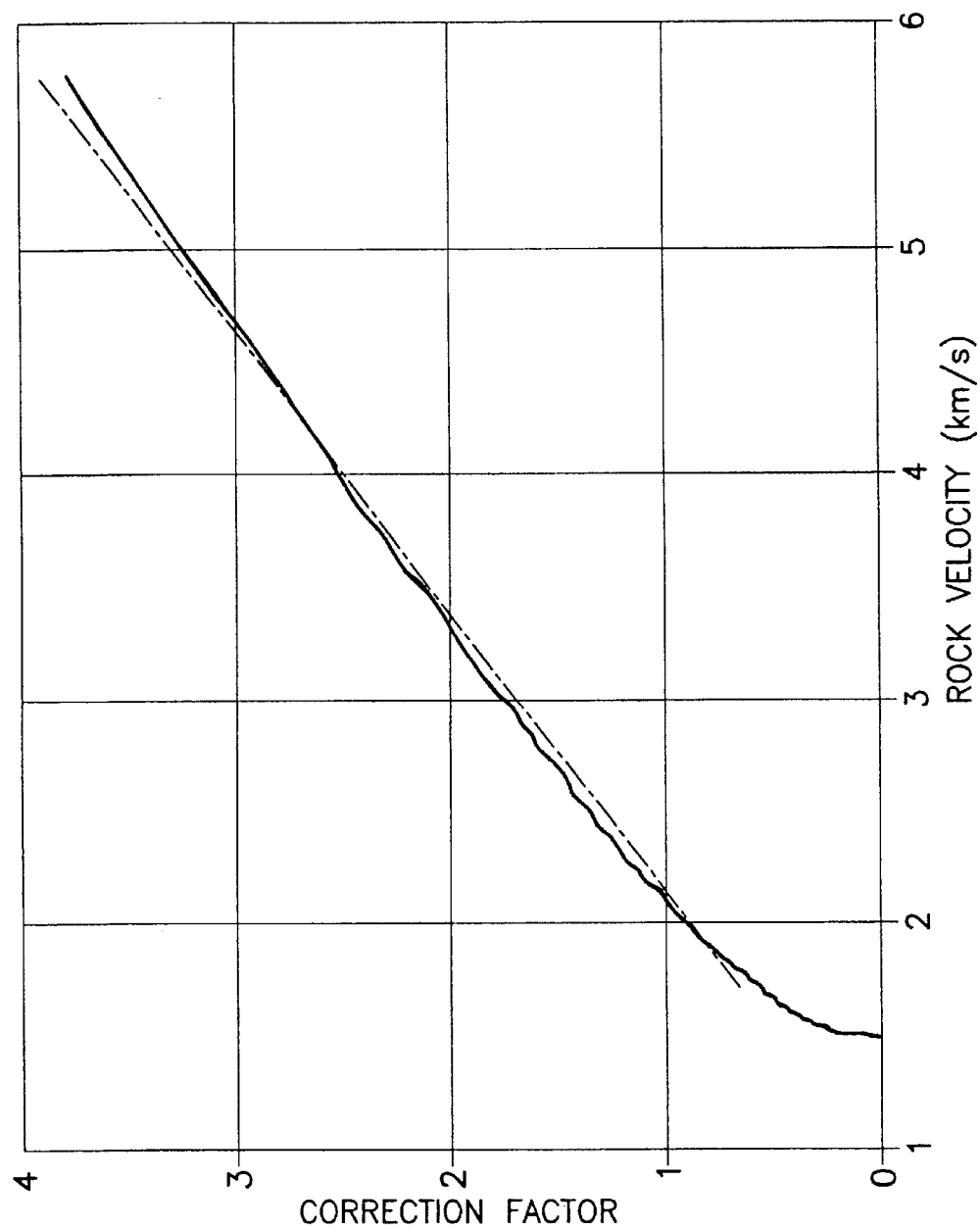
FIG. 7C displays a linear approximation to the receiver array calibration curve of Equation 8.

The dotted curve in FIG. 7C is the linear approximation given in Equation 8.

Figure 8A:
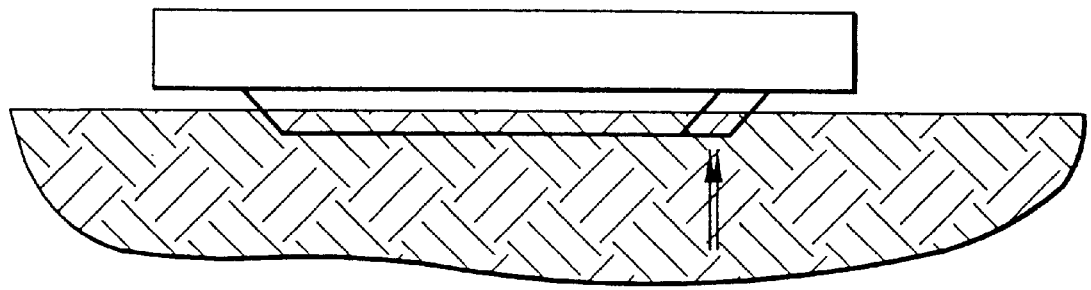
Figure 8B:
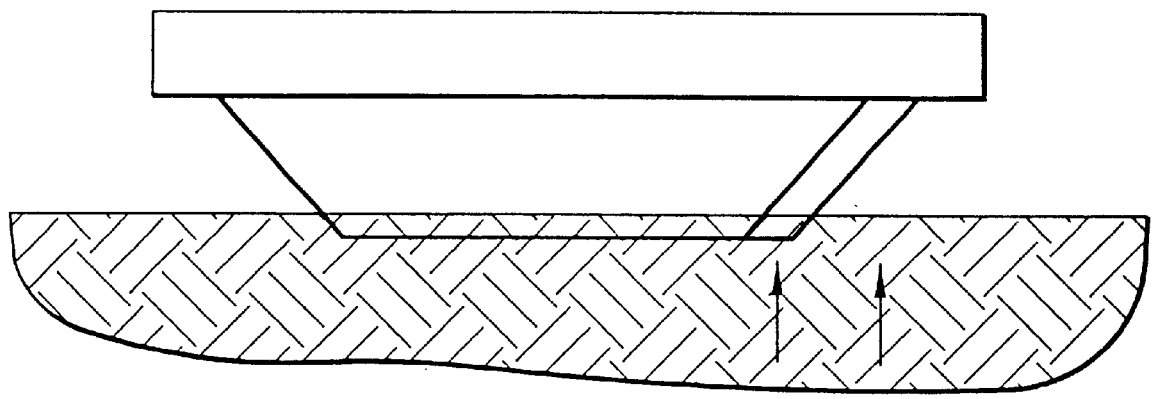

FIGS. 8A and 8B illustrate the ray-path situation with receiver standoff from the borehole wall. FIGS. 8A and 8B show small offset and large offset respectively.

FIGS. 8A and 8B illustrates the basic problem caused by standoff. To create a velocity image, we plot a velocity value at the location of the center of the receiver pair (right arrow on each panel). But because of a non-normal angle of incidence, the actual velocity measurement is made closer to the transmitter (left arrow on each panel). The position error increases with standoff.

Standoff can be estimated from absolute arrival times, and this can be used to correct for position shifts in the resulting image. With additional transducers, tilt corrections can be made and drill-bit drilling speed can be determined for accurate dip estimation. It is recommended to minimize standoff.

Wireline Tool for Imaging a Borehole Wall

A first preferred embodiment of the wireline tool of the present invention includes multiple pads azimuthaly spaced around an elongated body that is moveable through the borehole. Each pad includes one transmitter and a set of five receiver pairs. The elongated body is similar in mechanical structure to the mandrel disclosed in U.S. Pat. No. 5,463,320, issued Oct. 31, 1995, to Bonner et al. U.S. Pat. No. 5,463,320, in its entirety, is hereby incorporated herein by reference.

Figure 9A:
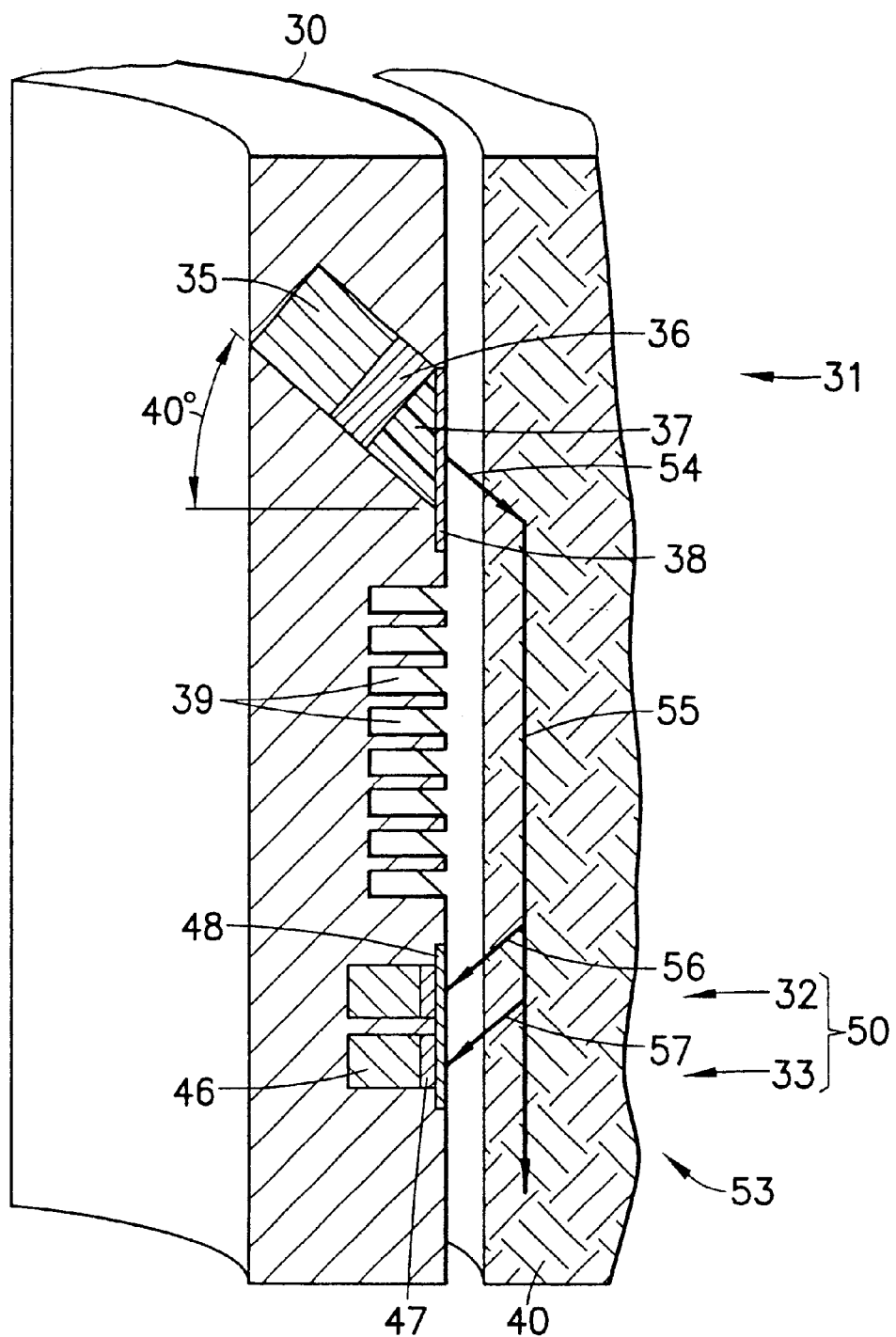
Figure 10A:
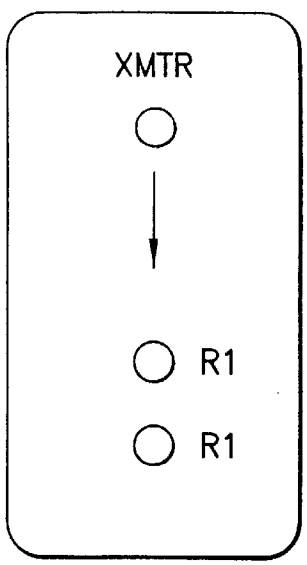
Figure 10B:
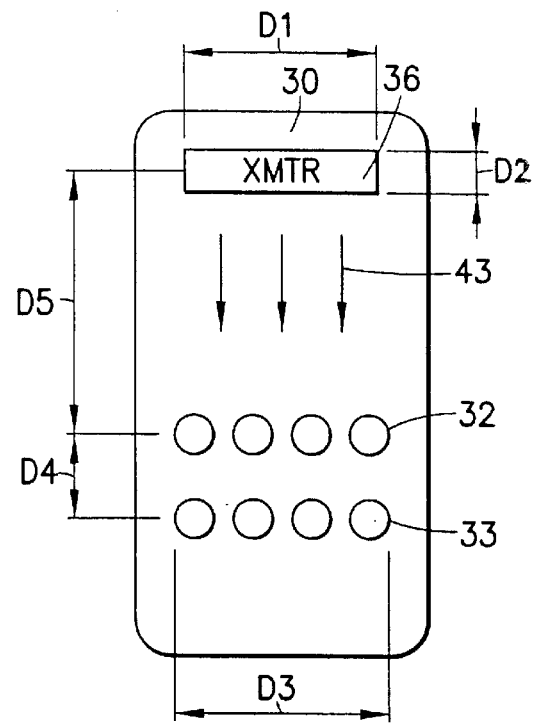

The first preferred embodiment is illustrated in FIGS. 9A and 10B.

FIG. 9A is a cross section of the preferred embodiment of a wireline pad showing the one transmitter and one of several pairs of receivers. Wireline pad 30 is shown inside a borehole in formation 40. Multiple pads 30 are mounted by a single strut (not shown) to an elongated body (not shown) similar to the single strut attachment of pad to mandrel described in U.S. Pat. No. 5,463,320. Multiple pads 30 each include one transmitter 31 and five receiver pairs 50. Each receiver pair includes first receiver 32 and second receiver 33. (Only one receiver pair is shown in FIG. 9A).

FIG. 9A also shows transmitter 31 including transmitter element backing 35, piezoelectric transmitter element 36, coupling wedge 37 made of PEEK (PolyEtherEtherKetone), and protective plate made of titanium 1/16 inch thick. In like manner each of receivers 32 and 33 include a receiver element backing 46 and a piezoelectric receiver element 47. Receivers 32 and 33 share a protective plate made of titanium 1/16 inch thick. In the preferred embodiment the wireline pad mounts the transmitter and the receiver in a single housing, the housing including slots 39 filled with a polymerized plastic material to minimize direct arrivals. FIG. 9A also shows the pulse path. Pulse path 53 includes an injection path portion 54 from the transmitter to the inside of the borehole wall, a longitudinal portion 55 inside the borehole wall, a first refraction path portion 56 to the first receiver and a second refraction path 57 to the second receiver.

Coupling wedge 37 fills the gap between the transducer and the pad face. A plastic material known as PEEK is recommended for the wedge. (A similar wedge is used the LWD embodiment). Because of additional refraction produced by the wedge, it is necessary to increase the angle of incidence of the transmitter element to compensate. When using a wedge made of PEEK, achieving a true angle of incidence of 25 degrees requires a transmitter element angle of incidence of 40 degrees. This is illustrated in FIGS. 9B–9C. The precise value of the transmitter element angle of incidence depends on the velocity of sound in the material used for the wedge.

FIG. 9B shows the refracted wave path in a simple embodiment without a wedge. In this embodiment the transmitter is angled at 25 degrees. FIG. 9C shows the refracted wave path in the preferred embodiment which includes coupling wedge 37 made of the plastic material PEEK. In this embodiment the transmitter element angle of incidence is 40 degrees.

In the preferred embodiment, the receivers are as shown in FIG. 10B. FIG. 10B shows pad 30, the location of transmitter element 36, transmitter width D1, transmitter length D2, receiver array width D3, receiver spacing D4, and transmitter to first receiver spacing D5. Arrows 43 indicate the direction of the ultrasonic waves. In the preferred embodiment, receivers 32 and 33 are oriented normal to the borehole wall to achieve greater receiver density than would be possible with angled alignment of the receivers.

Although protective plate 38 in the preferred embodiment is made of titanium, steel would probably work almost as well. The pad is preferably slotted between the transmitter and receivers, or the pad must be made of a low-velocity material such as Teflon. The slots have been found to work well, and are used in the preferred embodiment. It is recommended that the slots be filled with a suitable rubber compound to improve their effectiveness and to keep out drill mud. (This is also true for the slots on the LWD embodiment.)

The elongated body of wireline tool of the preferred embodiment also includes a wireline processor (not shown). The wireline processor (not shown) of the present invention is housed in the elongated body in the same way that the downhole processor of U.S. Pat. No. 5,463,320 is housed in the mandrel. The wireline processor is coupled electrically to all transmitters and to all receivers. The wireline processor, in a preferred embodiment executes all steps in FIGS. 1, 2A, 2B and 3.

Detailed specifications of the transmitter and receivers for a five-receiver pair ultrasonic pad are given in Table 1 below.

TABLE 1

|  |  | Preferred Value | Useable Range |
|---|---|---|---|
| Transmitter | center frequency | 200 kHz | 50–500 kHz |
|  | transmitter width | 12 mm | 5–25 mm |
|  | true angle of incidence | 25 degrees | 20–40 degrees |
| Receivers | diameter | 9 mm | 5–20 mm |
|  | center frequency | 200 kHz | 50–500 kHz |
|  | true angle of incidence | normal | 0–40 degrees |
| Spacing | T-$R_1$ spacing | 65 mm | 50–100 mm |
|  | $R_1$-$R_2$ spacing | 10 mm | 5–30 mm |

The preferred embodiment illustrated in Table 1 is capable of centimeter-scale resolution. Images can be obtained that are comparable to the quality of resistivity-based imagers, with the added advantage of working in oil-base mud.

Receiver Configurations for Wireline Tool

FIGS. 10A–10D show arrangements of receiver pairs on a wireline pad in relation to the transmitter.

FIG. 10A shows a transmitter with one pair of receivers.

FIG 10B shows one transmitter with four pairs of receivers. This pad is similar to the preferred embodiment. D1 is transmitter azimuthal length. D2 is transmitter depth. D3 is receiver array width. D4 is receiver to receiver spacing. D5 is transmitter to first receiver spacing.

Figure 10C:
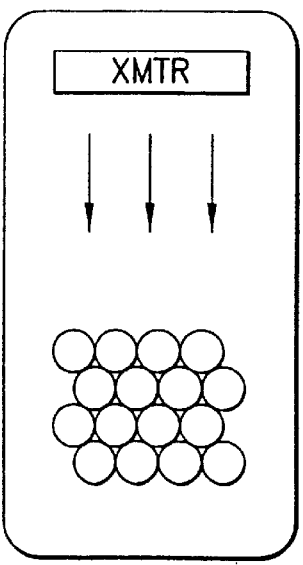

FIG. 10C shows one transmitter with eight azimuthally and axially offset pairs of receivers spaced for maximum density of receivers.

Figure 10D:
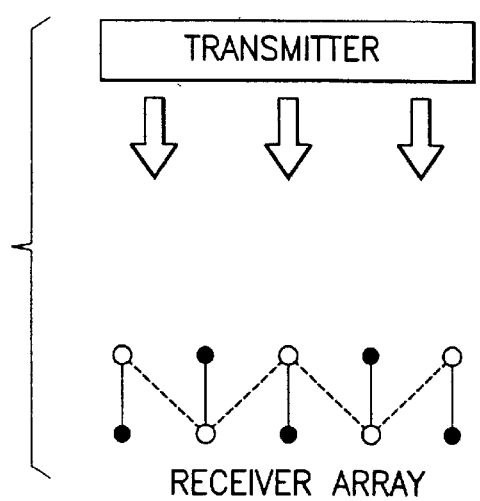

FIG. 10D shows one transmitter with five receivers coupled to form four pairs of receivers, wherein the first receiver of a first pair of receivers is also the first receiver of a second pair of receivers. In this case the five receivers with white dots form four receiver pairs (dashed lines). This configuration makes better use of the available receivers at the expense of a somewhat degraded image.

Transmitter for Wireline Tool

The ultrasonic transmitter is required to deliver significant energy into formations having a wide range of velocities. The formation velocity determines the angle of incidence required to excite a refracted head-wave. Ideally, the transmitter should have a beam pattern wide enough to provide significant energy at all the incidence angles that may be encountered. But a wide beam pattern also wastes a lot of energy, sending it in directions that do not excite head-waves. These two factors have to be balanced.

When a single pad is expected to work well in all formations, a transmitter width of 10–15 mm is preferred. When a pad is designed to work only in specific regions having a limited velocity range (such as in slow formations), it is recommended to have a larger transmitter width (e.g. 30 and 40 mm) and to optimize the angle for that particular velocity range.

In the preferred embodiment, an all-formation configuration, a transmitter width of 10–15 mm is used and the transmitter is oriented at an angle of 25 degrees to the borehole axis toward the receiver.

Ideally the transmitter is aimed at the critical angle of the formation being measured. For formations of interest, the critical angle ranges from 15 to 45 degrees, so it is not possible to optimally excite all formations with a fixed, single-element transmitter. Transmitting transducers are not perfectly collimated, but generate waves over a range of angles. Wider transducers are more well-collimated. Narrow transducers approach a line-source that radiates equally in all directions.

Rocks with lower velocity (higher critical angle) usually have stronger compressional head waves. Critical angles (peaks in the response curves) range from 15 degrees for a fast dolomite to 45 degrees for a slow shale. If a transmitter angle of 25 degrees is chosen, then there is loss of no more than 8 db in any lithology compared to an optimally aligned transmitter. However, at a 25 degrees incidence angle, the signal strength in the faster rocks will still be about 15 db lower than in the slower rocks.

A fixed transmitter angle of 25 degrees, will result in a strong compressional wave in slow formations, and a strong pseudo-Rayleigh in fast formations. A user of the present invention could select either compressional or pseudo-Rayleigh waves for measurements, according to formation type.

LWD Imaging Tool

Figure 11:
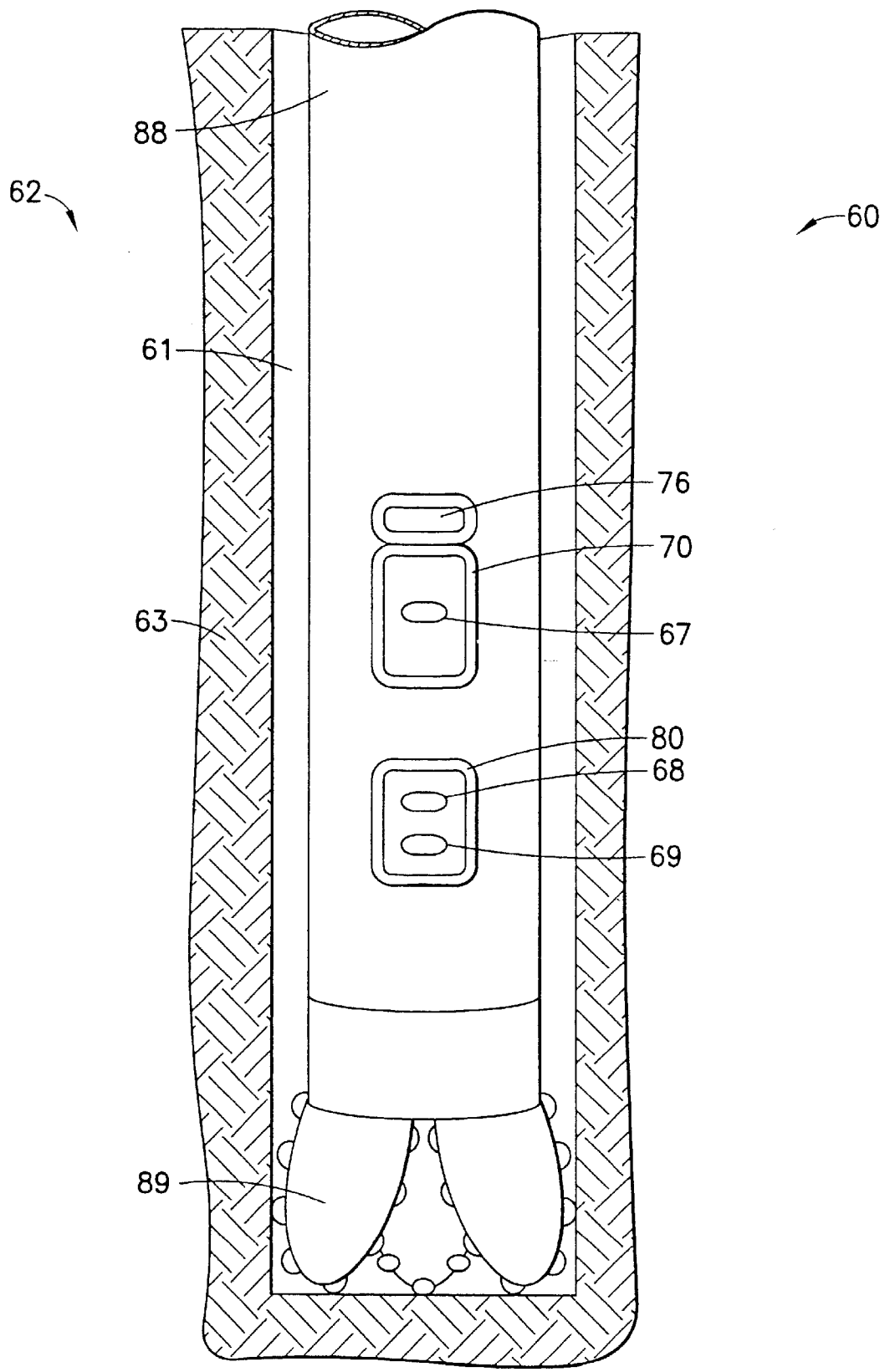
Figure 12:
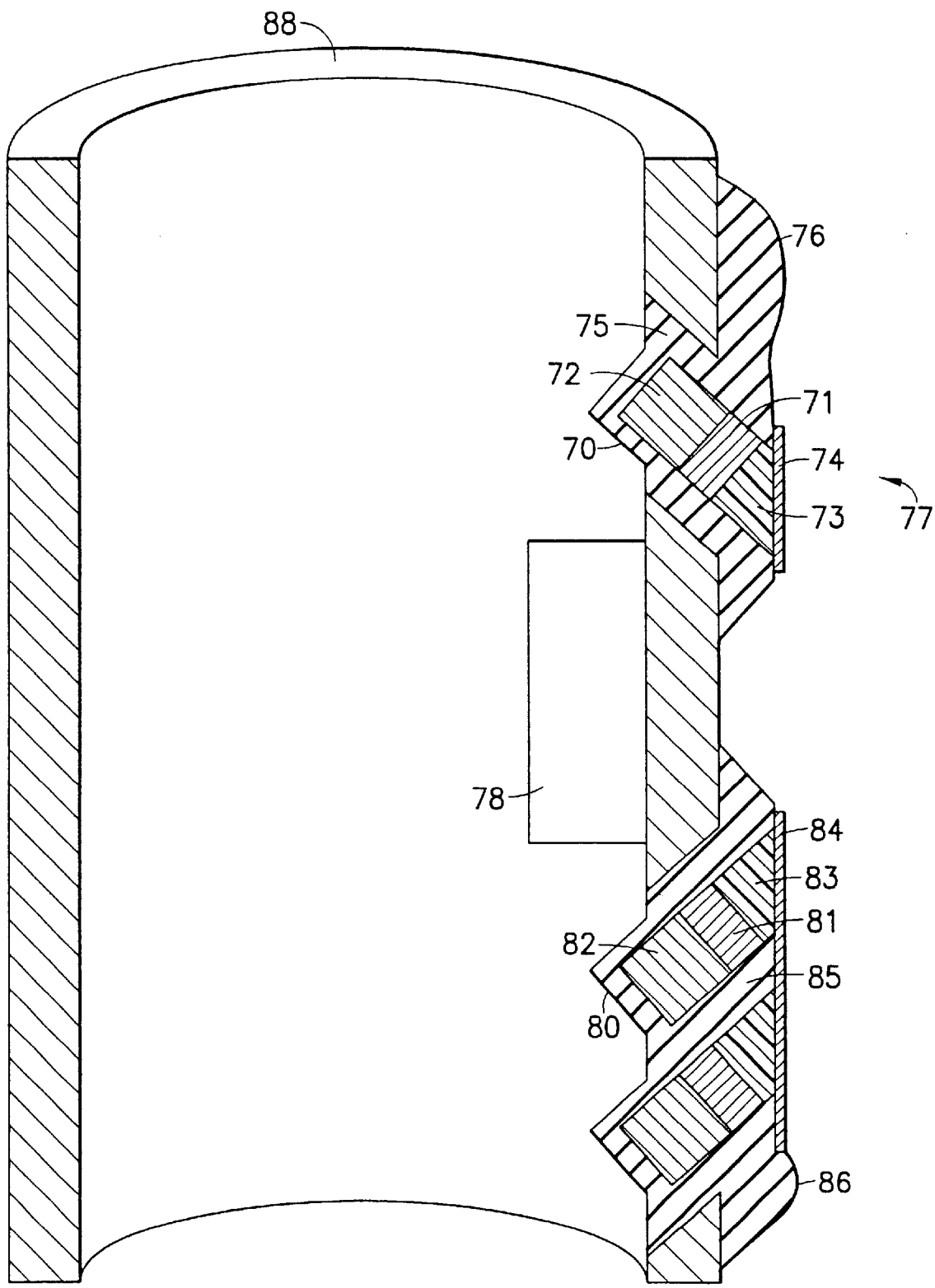

A preferred embodiment of an LWD ultrasonic imaging tool having one transmitter and one spaced-apart pair of receivers is shown in FIGS. 11 and 12. FIG. 11 is an elevation view. FIG. 12 is a partial cross-section view.

FIG. 11 shows LWD tool 60 in borehole 61 of formation 62. Transmitter assembly 70 with transmitter 67 is shown mounted in the wall of drill collar 88. Receiver assembly 80 with first receiver 68 and second receiver 69 are also mounted in the wall of drill collar 88 some axial distance apart from the transmitter. LWD tool 60 also includes LWD processor 78. The LWD processor is coupled electrically to the transmitter and to both receivers. The LWD processor, in a preferred embodiment executes all steps in FIGS. 1, 2A, 2B and 4.

Transducer/receiver pair separations on the order of 12 cm are recommended.

As shown in FIG. 12, both the transmitter and the receiver protrude from the wall of the drill collar.

By using a protruding transmitter and receiver assemblies, the ultrasonic transducers can protrude from the drill collar. This minimizes standoff. Bumpers protect the transducers from banging against the borehole wall.

FIG. 12 gives detail of the transmitter-assembly and the receiver assembly. Transmitter assembly 70 includes transmitter 77 with piezoelectric transmitter element 71. Piezoelectric element 71 is mounted between transmitter element backing 72 and coupling wedge 73. Protective layer 74 protects coupling wedge 73 and the piezoelectric element from damage. Assembly 70 further includes rubber isolation casing 75 which encloses all other parts at its upper end into bumper portion 76. The receiver assembly 80 includes first piezoelectric receiver element 81, and second piezoelectric receiver element backing 82. Receiver element 81 is mounted between receiver element backing 82 and coupling wedge 83. Protective plate 84 protects both coupling wedge 73 and their piezoelectric receiver element from damage. Assembly 80 further includes rubber isolation casing 85 which surrounds both receiver elements and all other parts of the receiver assembly from damage.

Separate assemblies are provided for the transmitter and the receiver array so as to minimize direct arrivals. The use of rubber isolation in both assemblies further minimizes direct arrivals.

FIGS. 13–16 are elevation views each showing an alternative embodiment of the LWD tool according to the present invention, each having a different transmitter/receiver arrangement.

FIG. 13 shows an embodiment having a transmitter sleeve 91 and a receiver sleeve 92.

FIG. 14 shows an embodiment having a transmitter/receiver sleeve 93 and sleeve slots 94 designed to minimize direct arrivals.

Figure 15:
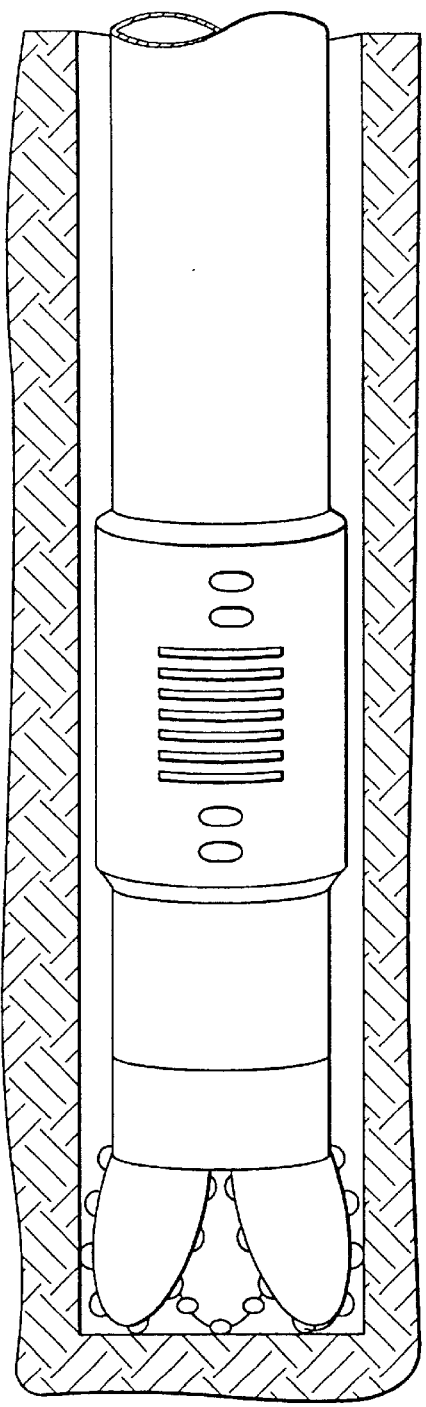

FIG. 15 shows an embodiment having a single sleeve. The sleeve has sleeve slots. The sleeve supports dual transmitters.

Figure 16:
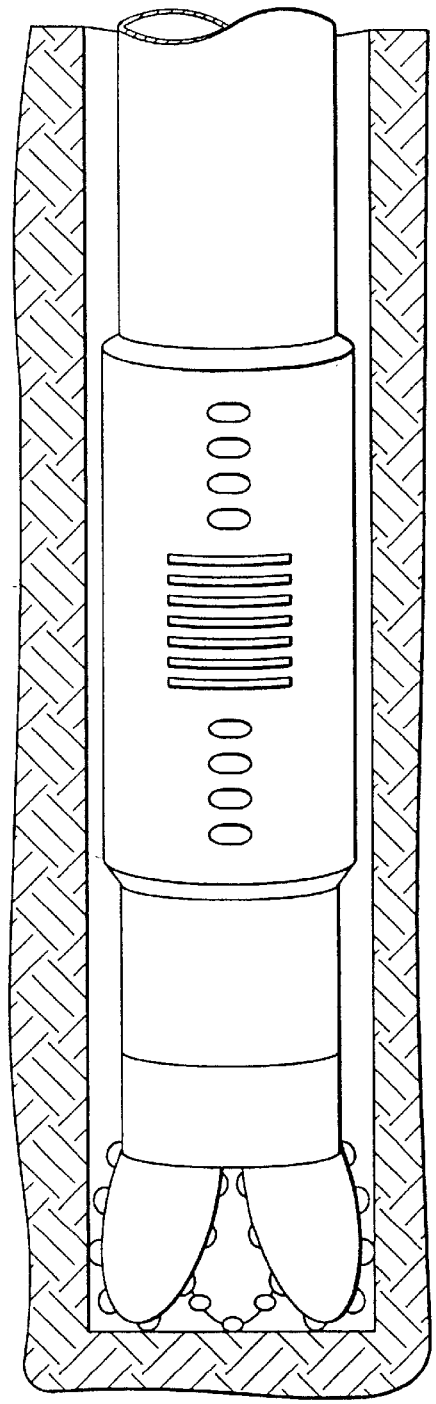
Figure 17:
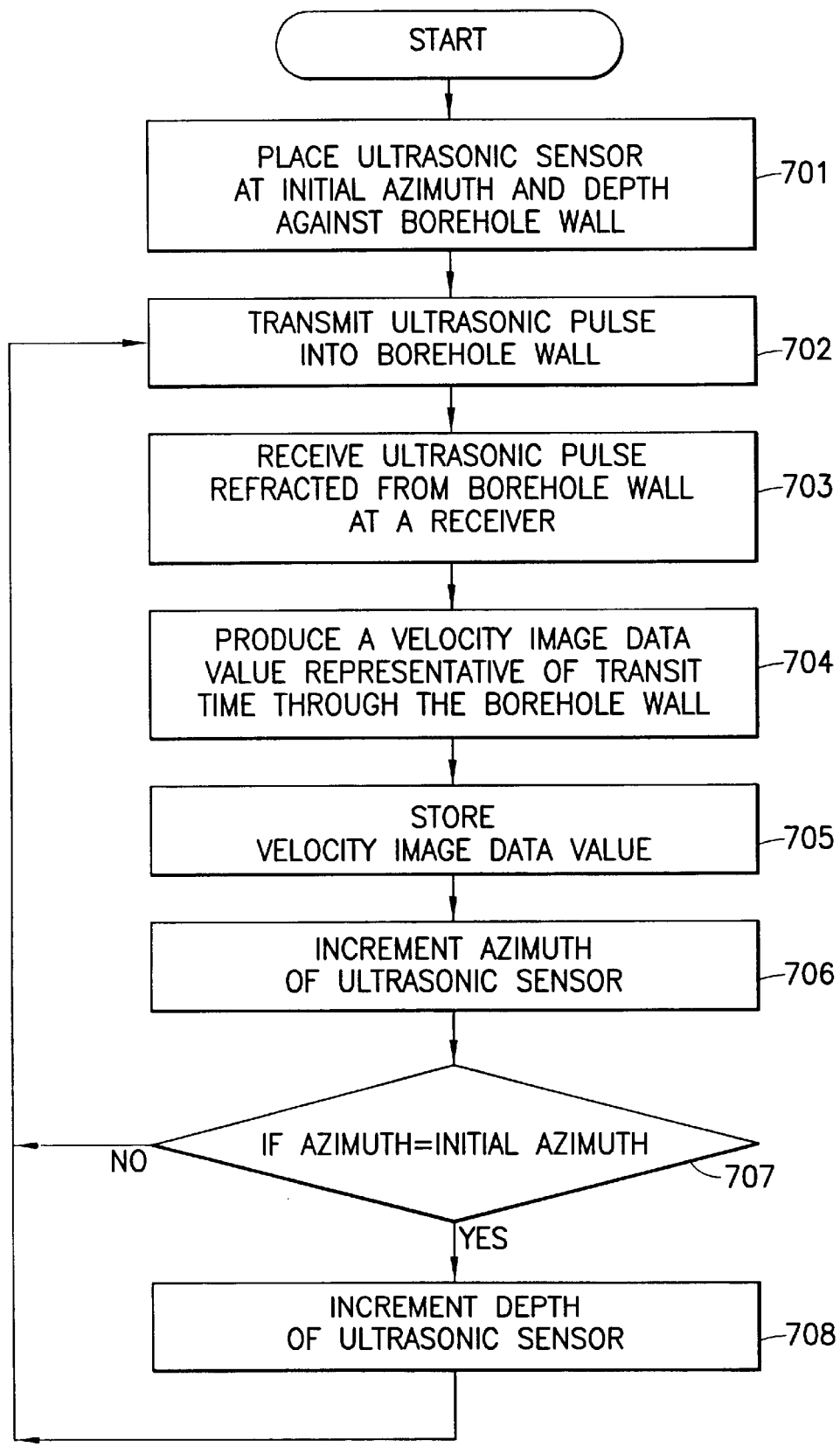
FIG. 17 is a flowchart of an alternative embodiment of the method of the invention using a single receiver.

FIG. 16 shows an embodiment having a single sleeve. The sleeve has sleeve slots. The sleeve supports multiple transmitters.

Experimental Results

Using test equipment described below, the inventors established that the physics of ultrasonic imaging makes the method of the present invention quite feasible for downhole applications. They investigated many issues of relevance to the measurement, sensitivity to rough surfaces, sensitivity to thin beds, quantitative velocity determination, fracture detection, cylindrical geometry, stress effects and pad acoustics. All experimental results were positive. One important finding was the discovery that surface roughness typical of many boreholes does not significantly effect the ultrasonic velocity measurement. Velocities can be quantitatively measured to within 2% in beds as thin as 2 cm, and beds as thin as 6 mm can be reliably detected. Fractures in sandstone are easily detected even at nearly vertical dips. No unusual problems were encountered in cylindrical geometry. The spatial resolution of the ultrasonic imager approaches those obtained by measurements of formation resistivity using techniques disclosed in U.S. Pat. No. 5,463,320, issued Oct. 31, 1995, to Bonner et al., while avoiding the problems encountered when making measurements of formation resistivity in oil-base muds. In addition, the present invention provides quantitative velocities for geomechanics and formation evaluation applications.

In experimental trials it was found that images from pseudo-Rayleigh waves have a different appearance than images from compressional waves. Images from pseudo-Rayleigh waves are found to be smoother and less speckled. Generally, both images reveal the same features—dipping beds, vertical and horizontal fractures. There are also differences between the images. The pseudo-Rayleigh has a more pronounced response to the sub-horizontal fractures. In one test the pseudo-Rayleigh image shows a rather featureless high velocity region, whereas the compressional image shows thick, low-velocity layers. Neither image is right or wrong, they are simply images of different properties.

Figure 18:
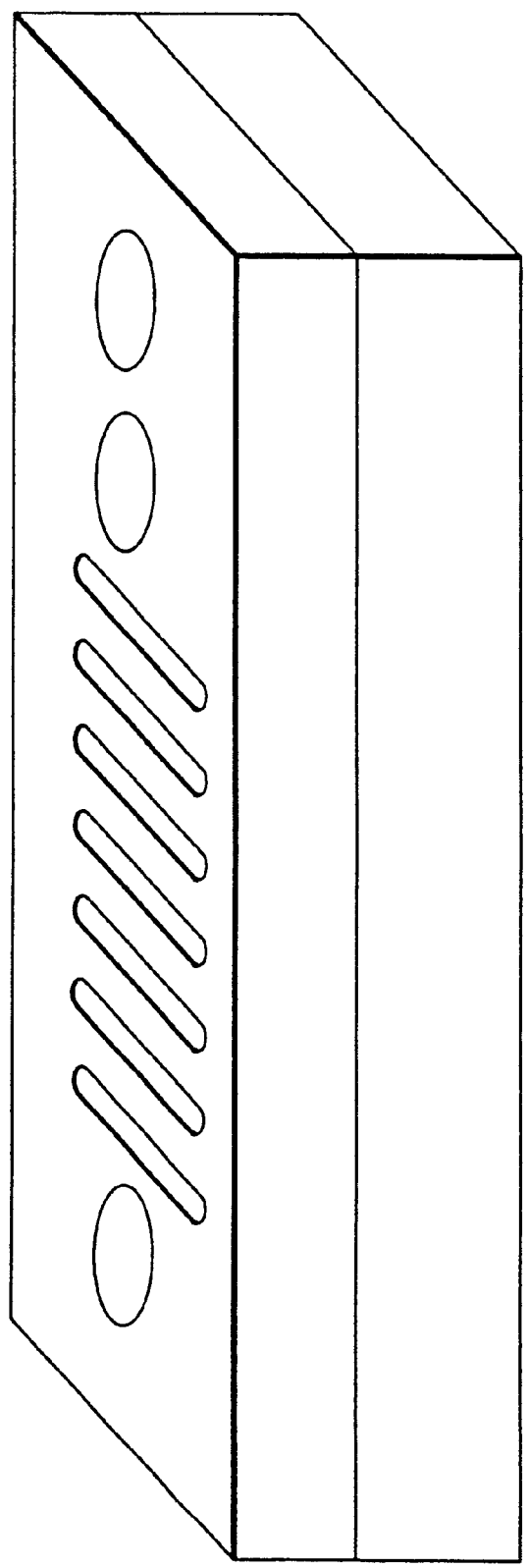
Figure 19:
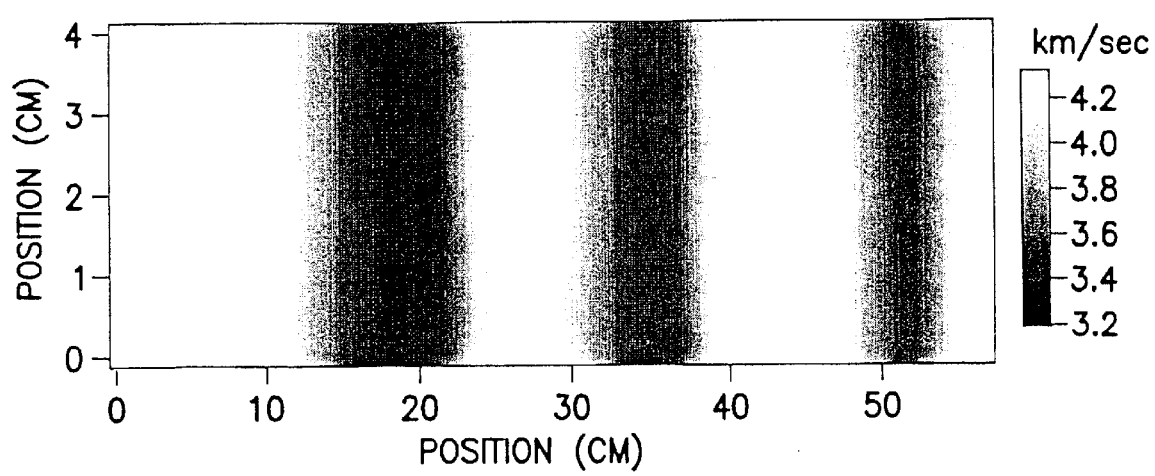
Figure 20:
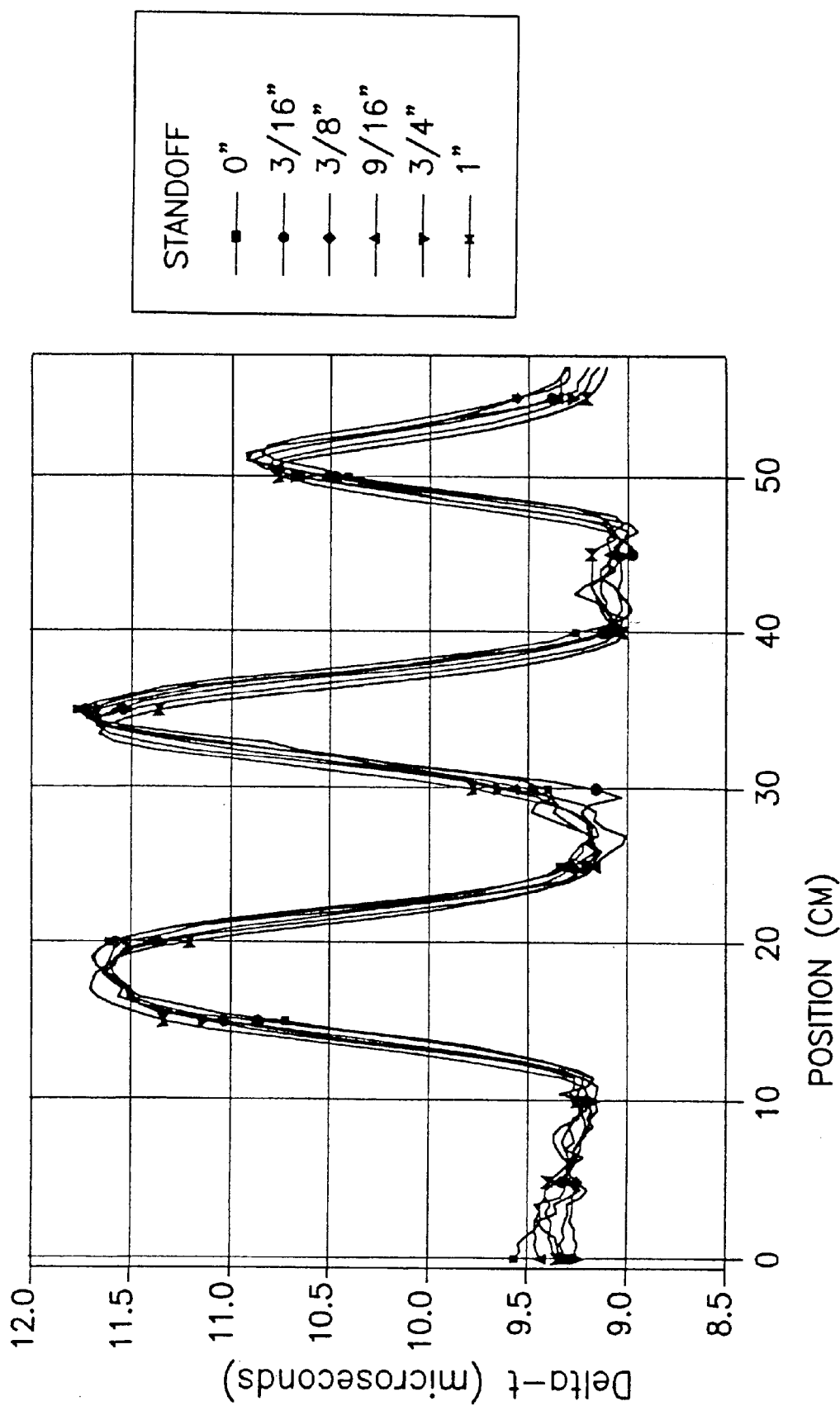
Figure 21:
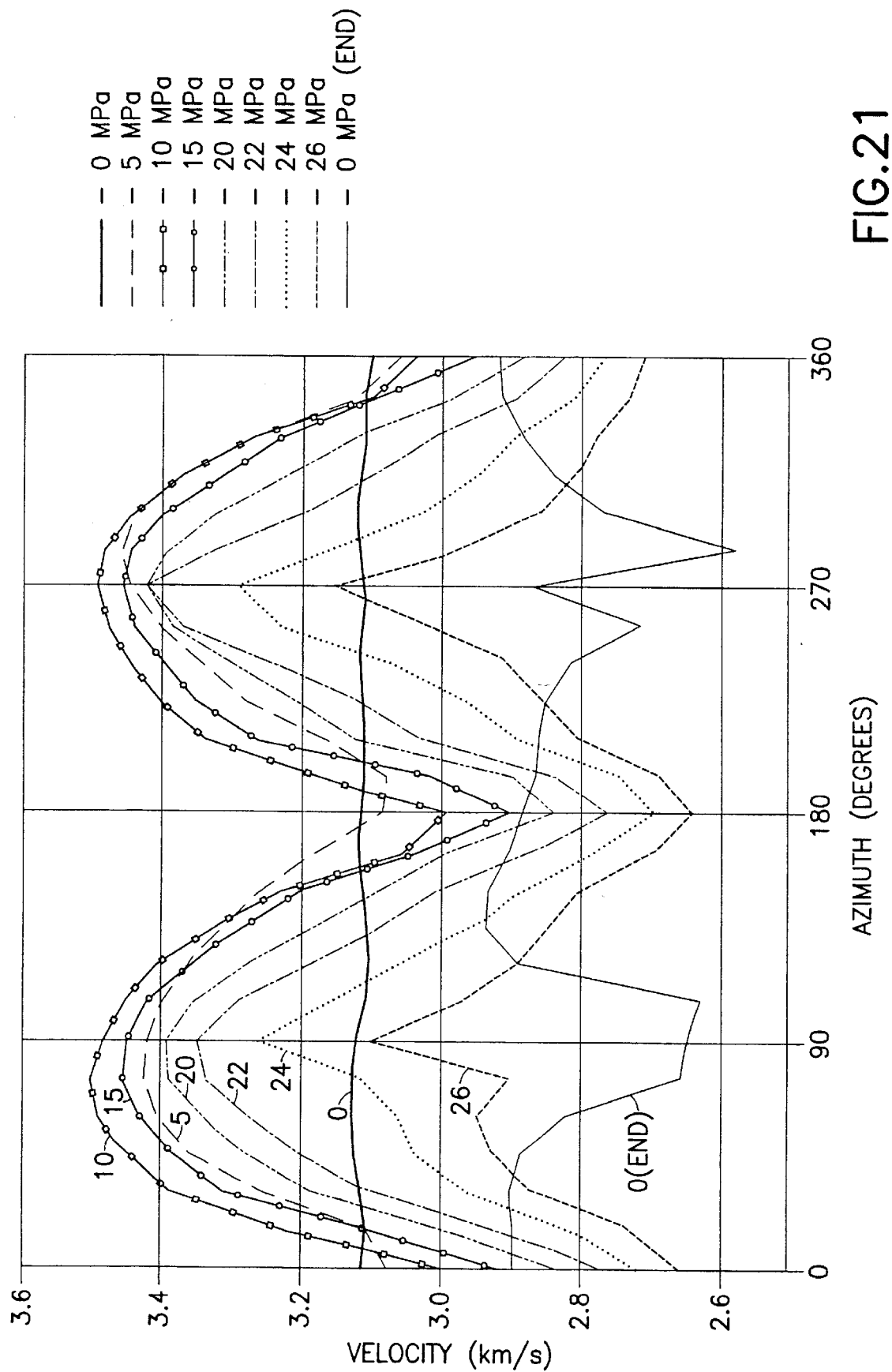
Figure 22A:
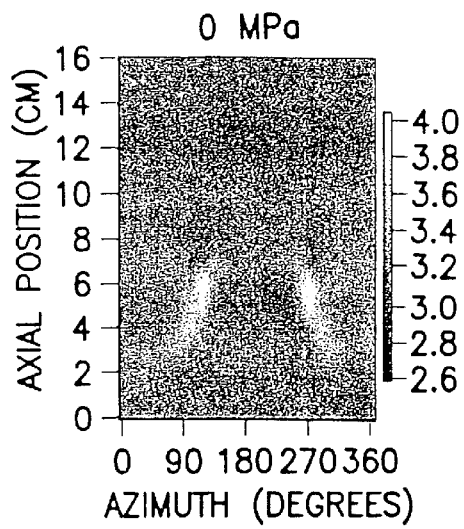
FIGS. 22A–22H is a set of borehole velocity images of Copper Massillon Sandstone
Figure 22B:
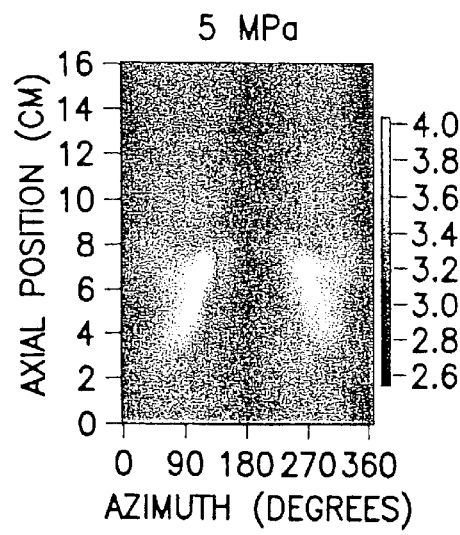
Figure 22C:
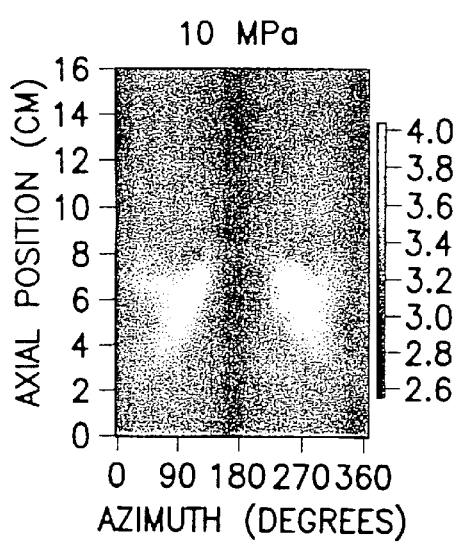
Figure 22D:
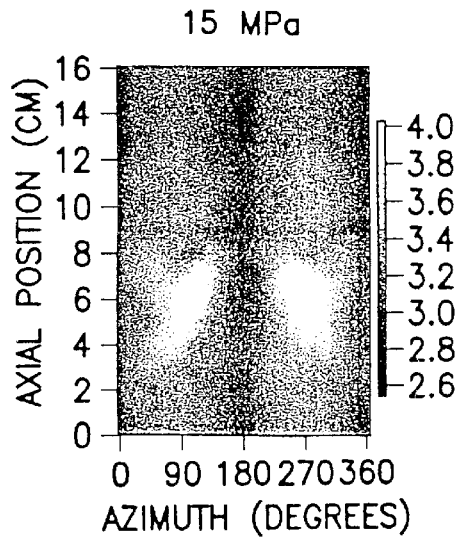
Figure 22E:
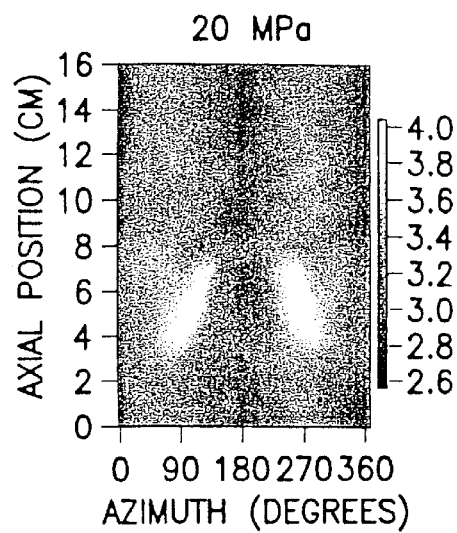
Figure 22F:
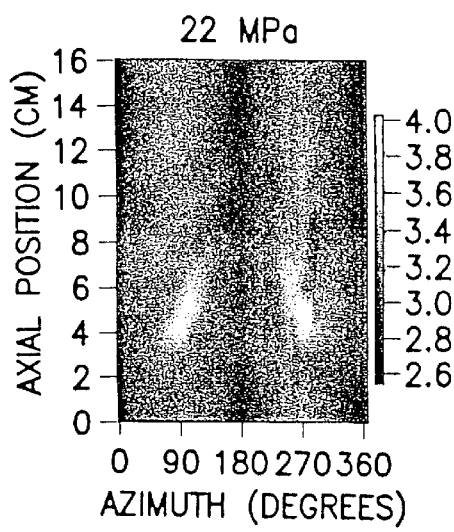
Figure 22G:
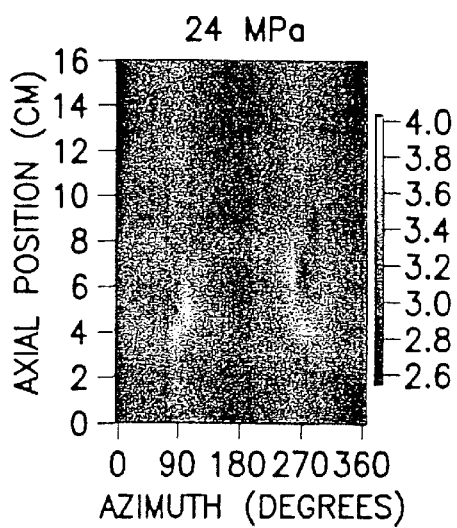
Figure 22H:
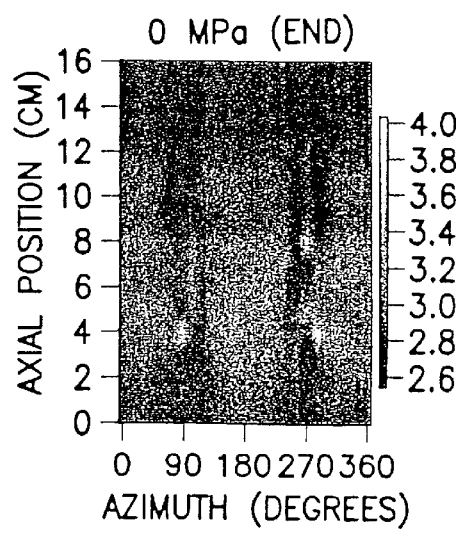
Figure 23A:
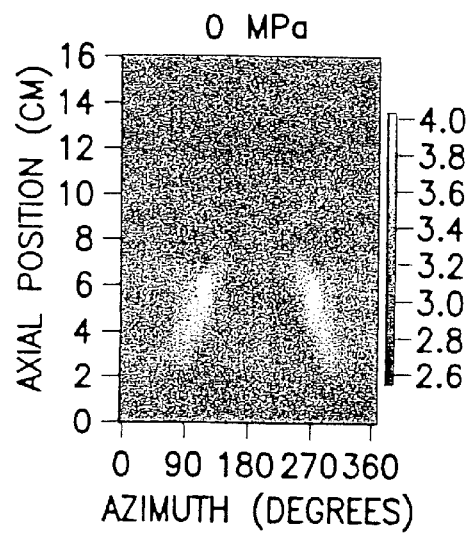
Figure 23B:
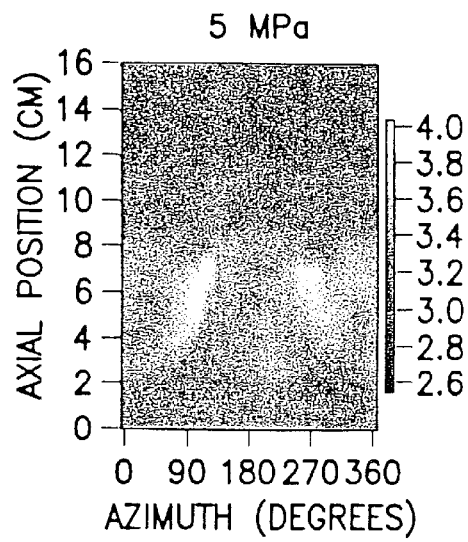
Figure 23C:
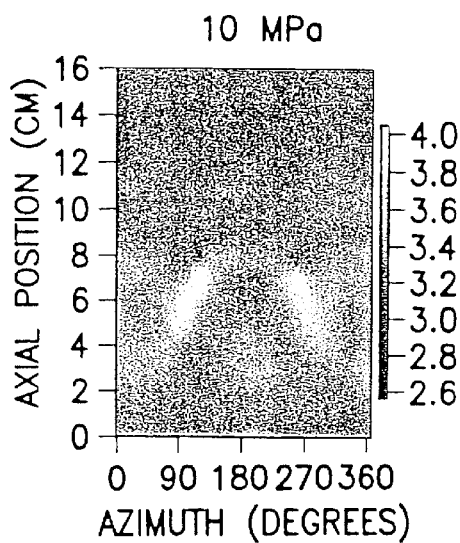
Figure 23D:
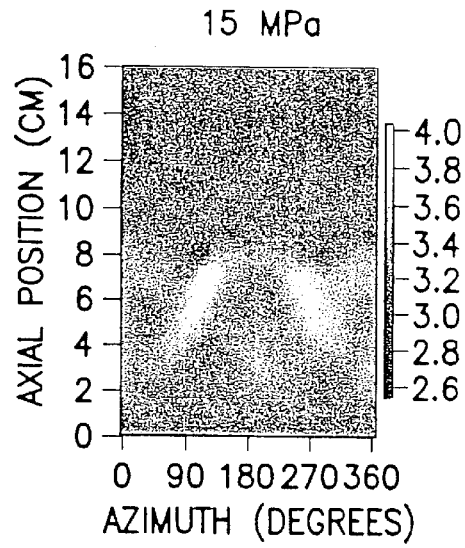
Figure 23E:
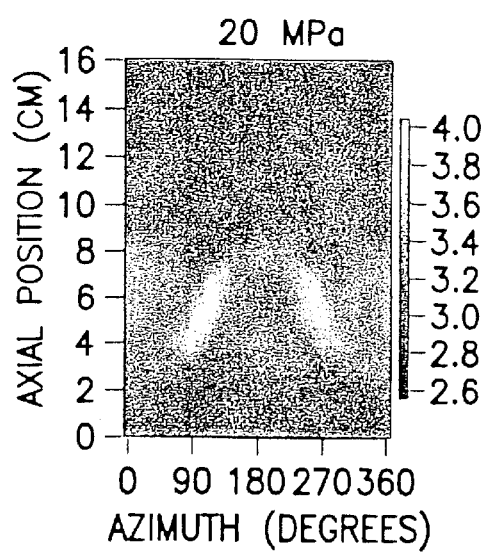
Figure 23F:
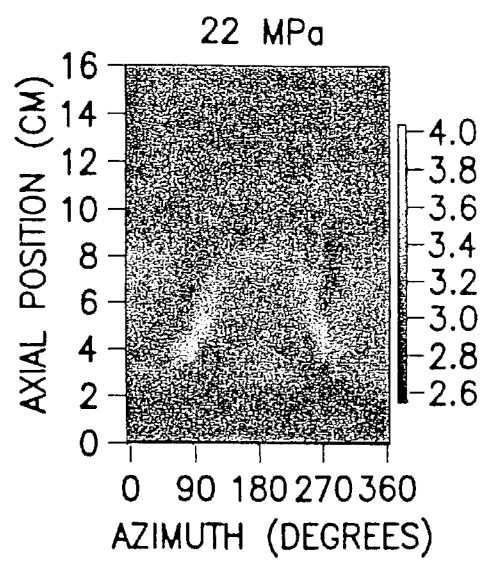
Figure 23G:
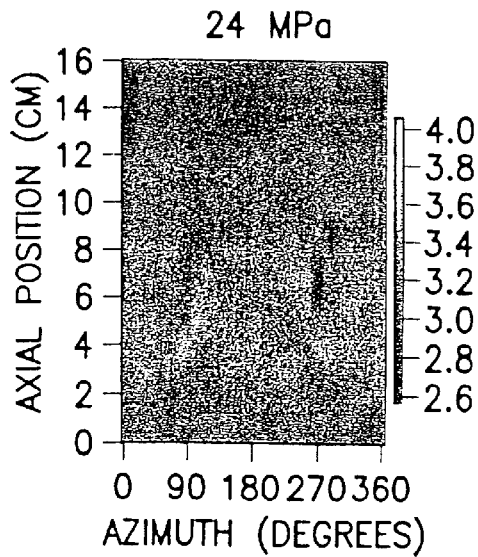
Figure 23H:
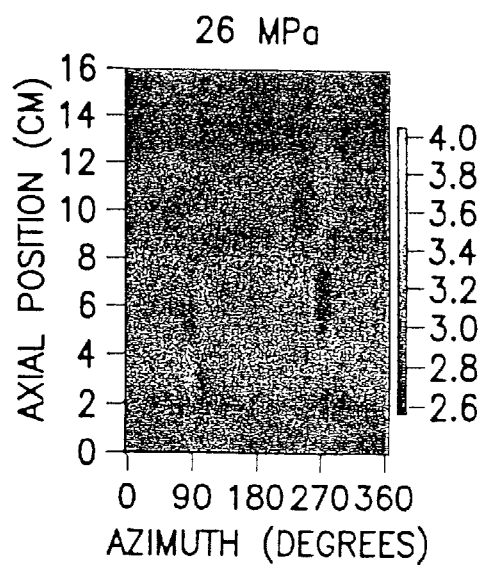

An experimental tool used in early testing of the concepts of the invention is shown in FIG. 18. Test results using this tool (and others similar to it) are displayed in FIGS. 19–23H. FIG. 19 is a velocity image of a layered cement sample, the image made from measurements using the experimental tool. FIG. 20 is a set of raw delta-time scans made over a layered cement sample, each scan made at a different standoff, using the experimental tool of FIG. 18B. FIG. 21 is a set of azimuthal velocity profiles of Copper Massillon Sandstone, using one of the experimental tools. FIGS. 22A–22H is a set of borehole velocity images of Copper Massillon Sandstone. FIGS. 23A–23H is a set of borehole velocity images of Copper Massillon Sandstone with stress effects processed out.

Another test was run on a block of Nugget sandstone, a thinly bedded aeolian sand composed of quartz grains with varying amounts of iron-oxide staining. The bedding results from variations in cementation, and dips at 42 degrees to the borehole axis. The sandstone image is shown in FIG. 24.

Figure 24:
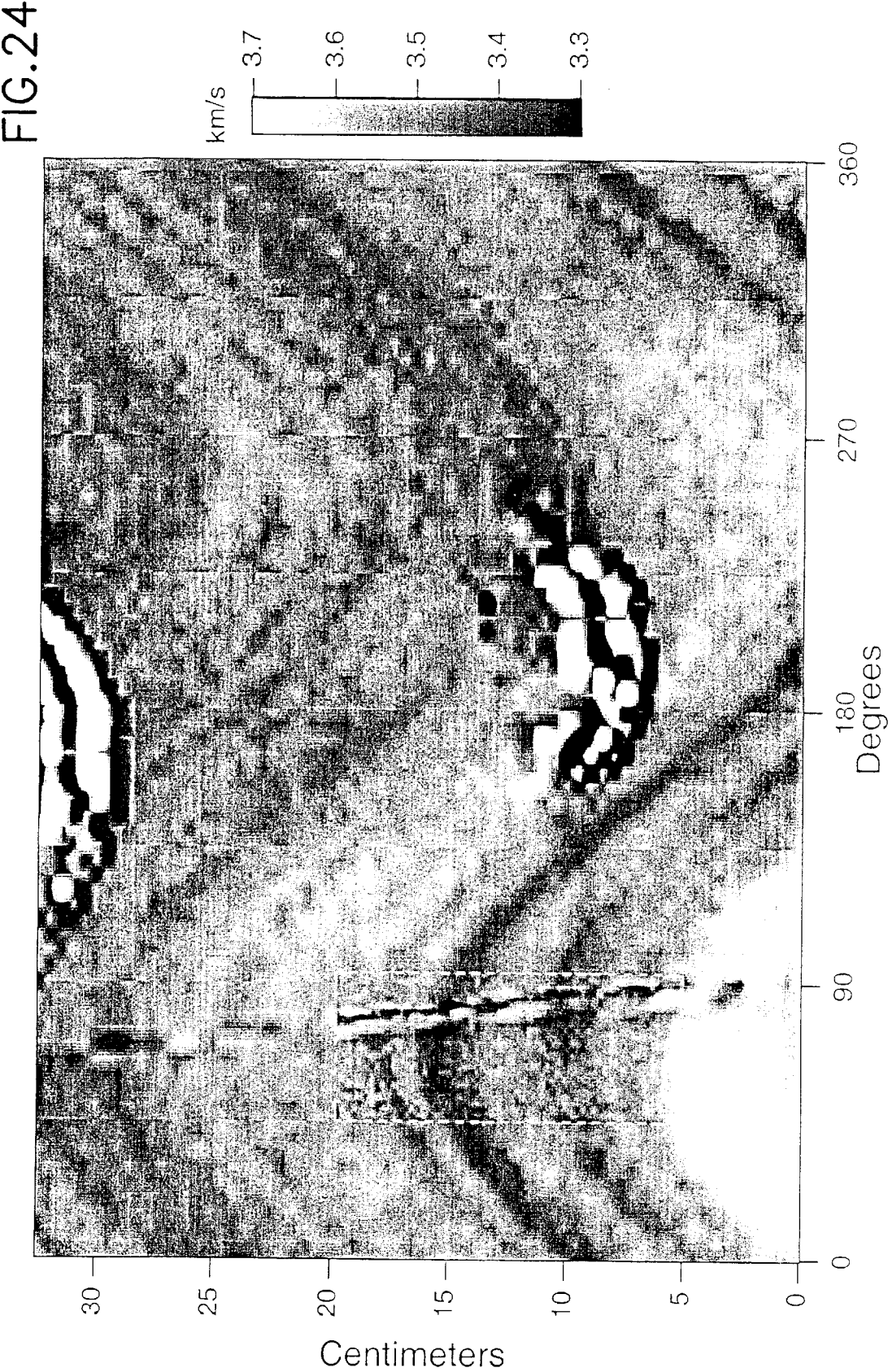
FIG. 24 is an image of a block of Nugget sandstone, a thinly bedded aeolian sand composed of quartz grains with varying amounts of iron-oxide staining.

The image shown in FIG. 24 reveals several fractures. A nearly vertical fracture runs the length of the borehole on one side. There are also several small dipping fractures that intersect approximately 90 degrees of the borehole circumference. The fractures are not significantly eroded where they intersect the borehole, and their aperture is less than one millimeter.

The bedding in the sample is clearly shown in the image, even though the velocity variations are only a few percent. Many of the beds have an apparent thickness of a centimeter or less. The vertical fracture is easily observed near 90 degrees azimuth. The region within the dashed box was scanned at a higher resolution of 2 mm×2.5 degrees (to highlight the fracture). The rest of the image was scanned at 5 mm×5 degrees. In this borehole, 5 degrees corresponds to 8.9 mm.

The two speckled regions near 180 degrees azimuth are associated with two dipping fractures that intersect approximately one-quarter of the circumference. By looking closely at the waveforms, it can be seen that the signal amplitude is often reduced whenever the fracture is located between the transmitter and the receivers. There are also very strong mode converted waves coming off the fracture. The signals are being sufficiently disturbed so as to corrupt the velocity measurements. This unusual fracture response is believed to be caused by air in the fractures.

We claim:

1. A method for producing a velocity image data set representing formation surrounding a borehole, the method comprising the steps of:
    a) transmitting an ultrasonic pulse through the wall of said borehole such that by refraction said ultrasonic pulse travels in said formation along said borehole;
    b) receiving said ultrasonic pulse at first and second receivers spaced-apart in a direction along said borehole;
    c) producing a velocity image data value indicative of difference of arrival times of said ultrasonic pulse at said first and second receivers;
    d) repeating steps a)–c) at a plurality of azimuths to produce a velocity image data value at each of the plurality of azimuths; and
    e) repeating steps a)–d) at a plurality of depths in the borehole to produce a velocity image data set.

2. A method according to claim 1, wherein producing a velocity image data value includes dividing receiver spacing by difference of arrival times.

3. A method according to claim 1, wherein step (c) further includes the step of:
    determining a compressional pulse arrival time by digitizing a signal from a receiver, determining noise level, setting a compressional amplitude threshold to be a multiple of the noise level, determining compressional amplitude threshold time as time at which an absolute value of the signal exceeds the threshold for compressional pulse, picking the first zero-crossing after threshold time, and setting compressional pulse arrival time equal to the time of first zero-crossing.

4. A method according to claim 3, further comprising the step of associating the velocity image data value derived from the compressional pulse arrival time with a compressional image data set.

5. A method according to claim 3, wherein step (c) further includes the steps of:
    determining a pseudo-Raleigh pulse arrival time by setting a pseudo-Raleigh amplitude threshold to be a multiple of the larger of the first two extrema of signal following the first zero-crossing, determining pseudo-Raleigh amplitude threshold time as time at which an absolute value of the signal exceeds the threshold for pseudo-Raleigh pulse, picking the first zero-crossing after pseudo-Raleigh threshold time, and setting pseudo-Raleigh pulse arrival time equal to the time of first zero-crossing.

6. A method according to claim 5, further comprising the step of associating the velocity image data value derived from the pseudo-Raleigh pulse arrival with a pseudo-Raleigh velocity data set.

7. A method according to claim 3, further comprising the step of calculating a correction factor to correct for error in effective spacing between receivers according to critical angle and formation velocity.

8. A method for producing a velocity image data set representing formation surrounding a borehole, the method comprising the steps of:
    a) measuring ultrasonic velocity in a portion of a formation surrounding the wall of said borehole at a plurality of azimuths and depths in the borehole to produce a velocity value at each of the plurality of azimuths and depths; and
    b) using the velocity values as a two-dimensional velocity image data set.

9. A method according to claim 8, wherein measuring ultrasonic velocity includes dividing receiver spacing by difference of arrival times of an ultrasonic pulse refracted from the wall of said borehole at first and second spaced-apart receivers, said receivers spaced-apart in a direction along said borehole.

10. A tool for producing a velocity image data set representing formation surrounding a borehole, comprising:
    a) transmitter means for transmitting an ultrasonic pulse through the wall of said borehole such that by refraction said ultrasonic pulse travels in said formation along said borehole;
    b) receiver means for receiving said ultrasonic pulse at first and second locations spaced-apart in a direction along said borehole;
    c) means for producing a velocity image data value indicative of difference of arrival times of said ultrasonic pulse at said first and second locations;
    d) means for operating said transmitter means and said receiver means at a plurality of azimuths and depths in the borehole to produce a velocity image data set.

11. A tool according to claim 10, wherein said means for transmitting an ultrasonic pulse includes an ultrasonic transmitter attached to an elongate body that is moveable through said borehole.

12. A tool according to claim 10, wherein said means for receiving said ultrasonic pulse includes first and second receivers spaced-apart in a direction along said borehole.

13. A tool according to claim 10, wherein said means for operating said transmitter means and said receiver means includes means for operating said transmitter means and said receiver means at a plurality of azimuths, means for operating said transmitter means and said receiver means at a plurality of depths in the borehole, and processor means for compiling a velocity image data set.

14. A tool for producing a velocity image data set representing formation surrounding a borehole, comprising:
    an elongate body that is moveable through the borehole;
    an ultrasonic transmitter attached to said elongate body for transmitting ultrasonic pulses through the borehole wall;
    at least one ultrasonic receiver, attached to said elongate body and spaced apart from said transmitter, for receiving refracted ultrasonic pulses from the borehole wall; and
    a processor, coupled to said at least one ultrasonic receiver, including means for producing a velocity image data value from time of flight of an ultrasonic pulse, at a plurality of azimuths and depths in the borehole.

15. A tool for producing a velocity image data set representing formation surrounding a borehole, comprising:
    an elongate body that is moveable through the borehole;

an ultrasonic transmitter attached to said elongate body for transmitting ultrasonic pulses through the borehole wall;

at least one pair of first and second spaced-apart ultrasonic receivers, attached to said elongate body and spaced apart from said transmitter, for receiving refracted ultrasonic pulses from the borehole wall; and a processor, coupled to said receivers, including means for producing a velocity image data value from difference of arrival times at first and second spaced-apart receivers, at a plurality of azimuths and depths in the borehole.

16. A tool according to claim 15, wherein the tool is a wireline tool adapted for suspension from a wireline;

wherein said at least one ultrasonic receiver includes a plurality of pairs of receivers located at azimuthal intervals around the elongate body, each pair of receivers including first and second spaced-apart receivers;

wherein said processor is coupled to receive signals from a pair of receivers; and wherein said processor includes means for producing a velocity image data value indicative of difference of arrival times at first and second spaced-apart receivers.

17. A wireline tool according to claim 16, wherein said processor includes means for associating a difference of arrival times with an azimuthal position of first and second spaced-apart receivers such as to produce image data with an azimuthal position attribute.

18. A wireline tool according to claim 17, wherein said processor includes means for associating a difference of arrival times with a depth in the borehole such as to produce an image data value with an azimuthal position attribute and a depth attribute.

19. A wireline tool according to claim 18, wherein said processor includes means for adding image data values to a stored velocity image data set.

20. A wireline tool according to claim 18, wherein said processor further includes means for identifying an arrival as a compressional pulse arrival.

21. A wireline tool according to claim 18, wherein said processor further includes means for identifying an arrival as a pseudo-Raleigh pulse arrival.

22. A wireline tool according to claim 18, wherein said processor further includes means for determining a difference of arrival times at the first and second spaced-apart receivers.

23. A wireline tool according to claim 18, wherein said processor further includes means for dividing spacing between first and second receivers by difference of arrival times.

24. A wireline tool according to claim 18, wherein said processor further includes means for first motion detection.

25. A wireline tool according to claim 18, wherein said processor further includes means for first zero crossing detection.

26. A wireline tool according to claim 18, wherein said plurality of pairs of receivers comprises a plurality of azimuthally aligned pairs of receivers.

27. A wireline tool according to claim 18, wherein a first pair of receivers is axially offset from a second pairs of receivers.

28. A wireline tool according to claim 18, wherein a first receiver is azimuthally offset from a second receiver.

29. A wireline tool according to claim 16, wherein the first receiver of a first pair of receivers is also the first receiver of a second pair of receivers.

30. A wireline tool according to claim 16, wherein at least one ultrasonic transmitter includes means for transmitting a pulse of ultrasonic waves in the frequency range 50–500 kHz.

31. A wireline tool according to claim 30, wherein said at least one ultrasonic transmitter element includes a directional transducer.

32. A wireline tool according to claim 31, wherein said at least one ultrasonic transmitter element is oriented at a true angle of incidence such that ultrasonic compressional waves propagate longitudinally with respect to the borehole along a portion of the borehole wall.

33. A wireline tool according to claim 32, wherein said true angle of incidence is approximately 25 degrees.

34. A wireline tool according to claim 32, wherein said true angle of incidence is approximately 40 degrees.

35. A wireline tool according to claim 32, wherein said true angle of incidence is in the range 20–40 degrees.

36. A wireline tool according to claim 32, wherein each receiver is oriented normal to the borehole wall for greater receiver density.

37. A tool according to claim 15, wherein the transmitter has a width of approximately 12 mm.

38. A tool according to claim 15, wherein the transmitter has a selected width in the range 10–15 mm.

39. A tool according to claim 15, wherein the transmitter has a selected width in the range 30–40 mm and an angle that is optimized for the velocity range of a slow formation.

40. A tool according to claim 15, wherein the tool is an LWD tool and the elongate body is a portion of drill string proximate to a drill bit;

wherein said at least one ultrasonic receiver is a pair of first and second spaced-apart receivers;

wherein said processor is coupled to receive signals from the pair of receivers; and wherein said processor includes means for producing a velocity image data value from difference of arrival times at first and second spaced-apart receivers.

41. An LWD tool according to claim 40, wherein said processor includes means for associating a difference of arrival times with an azimuthal position of first and second spaced-apart receivers to produce a series of image data values with an azimuthal position attribute as the drill string rotates in the borehole.

42. An LWD tool according to claim 41, wherein said processor includes means for associating a difference of arrival times with a depth in the borehole to produce an image data value with an azimuthal position attribute and a depth attribute.

43. An LWD tool according to claim 40, wherein said processor includes means for adding image data values to a stored borehole wall image data set.

44. An LWD tool according to claim 40, wherein said processor further includes means for identifying an arrival as a compressional pulse arrival.

45. An LWD tool according to claim 40, wherein said processor further includes means for first motion detection.

46. An LWD tool according to claim 40, wherein said processor further includes means for identifying an arrival as a pseudo-Raleigh pulse arrival.

47. An LWD tool according to claim 46, wherein said processor further includes means for first zero crossing detection.

48. An LWD tool according to claim 40, wherein said processor further includes means for determining a difference of arrival times at first and second spaced-apart receivers.

49. An LWD tool according to claim 40, wherein said processor further includes means for dividing receiver spacing by difference of arrival times at first and second spaced-apart receivers.

50. An LWD tool according to claim 40, the tool further comprising mud pulse data transmitter for transmitting velocity image data values to the surface station.

51. An LWD tool according to claim 40, further comprising a transmitter/receiver mount, attached to the drill string proximate to the drill bit, having a cylindrical section portion between said transmitter and said pair of receivers, the cylindrical section portion defining at least one slot for blocking direct arrivals.

52. An LWD tool according to claim 51, wherein a slot is filled with a rubber compound for blocking direct arrivals.

53. An LWD tool according to claim 40, further comprising a sleeve-like transmitter mount for attaching said ultrasonic transmitter to said drill string; and a sleeve-like receiver mount for attaching said pair of receivers to said drill string.

54. An LWD tool according to claim 40, wherein said receiver mount is sized to minimize standoff of a pair of receivers from the borehole wall.

55. An LWD tool according to claim 40, wherein each receiver is oriented normal to the drill string axis.

56. An LWD tool according to claim 40, wherein each receiver is a segmented cylindrical receiver.

57. An LWD tool according to claim 40, further comprising a plurality of transmitters and a plurality of groups of receivers, each transmitter associated with a group of receivers.

58. An LWD tool according to claim 57, wherein a group of receivers comprises a plurality of azimuthally spaced pairs of receivers.

59. An LWD tool according to claim 57, wherein a first pair of receivers is axially offset from a second pair of receivers.

60. An LWD tool according to claim 57, wherein a pair of receivers includes a first receiver and a second receiver, and wherein said first receiver is azimuthally offset from the second receiver.

61. An LWD tool according to claim 40, wherein the first receiver of a first pair of receivers is also the first receiver of a second pair of receivers.

62. An LWD tool according to claim 15, wherein said ultrasonic transmitter includes means for transmitting pulses of ultrasonic waves in the frequency range 50–500 kHz.

63. An LWD tool according to claim 62, wherein said transmitter comprises a directional transmitter element for generating directional pulses of ultrasonic waves.

64. An LWD tool according to claim 63, wherein said transmitter element is oriented at a true angle of incidence such that ultrasonic compressional waves propagate toward the receiver along a portion of the borehole wall longitudinally with respect to the borehole.

65. An LWD tool according to claim 64, wherein the true angle of incidence is selected to optimize for compressional waves.

66. An LWD tool according to claim 64, wherein the true angle of incidence is approximately 25°.

67. An LWD tool according to claim 64, wherein the true angle of incidence is in the range 20°–40°.

68. An LWD tool according to claim 64, wherein said transmitter is oriented at true angle of incidence is selected to optimize for ultrasonic pseudo-Raleigh waves.

69. An LWD tool according to claim 15, further comprising a coupling wedge made of PEEK mounted proximate to the transmitter.

70. An LWD tool according to claim 15, further comprising a coupling wedge made of PEEK mounted proximate to the receiver.

71. An LWD tool according to claim 15, further comprising a protective plate made of titanium mounted proximate to at least one receiver.

72. A method according to claim 15, wherein producing a velocity value at each of the plurality of azimuths and depths in the borehole includes:
   a) transmitting an ultrasonic pulse through the wall of said borehole such that by refraction said ultrasonic pulse travels in said formation along said borehole;
   b) receiving said ultrasonic pulse at first and second receivers spaced-apart in a direction along said borehole;
   c) producing a velocity image data value indicative of difference of arrival times of said ultrasonic pulse at said first and second receivers;
   d) repeating steps a)–c) at a plurality of azimuths to produce a velocity image data value at each of the plurality of azimuths; and
   e) repeating steps a)–d) at a plurality of depths.

73. A method according to claim 72, wherein producing a velocity image data value includes dividing receiver spacing by difference of arrival times.

74. A method according to claim 72, wherein step (c) further includes the step of:
   determining a compressional pulse arrival time by digitizing a signal from a receiver, determining noise level, setting a compressional amplitude threshold to be a multiple of the noise level, determining compressional amplitude threshold time as time at which an absolute value of the signal exceeds the threshold for compressional pulse, picking the first zero-crossing after threshold time, and setting compressional pulse arrival time equal to the time of first zero-crossing.

75. A method according to claim 74, further comprising the step of associating the velocity image data value derived from the compressional pulse arrival time with a compressional image data set.

76. A method according to claim 74, wherein step (c) further includes the steps of:
   determining a pseudo-Raleigh pulse arrival time by setting a pseudo-Raleigh amplitude threshold to be a multiple of the larger of the first two extrema of signal following the first zero-crossing, determining pseudo-Raleigh amplitude threshold time as time at which an absolute value of the signal exceeds the threshold for pseudo-Raleigh pulse, picking the first zero-crossing after pseudo-Raleigh threshold time, and setting pseudo-Raleigh pulse arrival time equal to the time of first zero-crossing.

77. A method according to claim 76, further comprising the step of associating the velocity image data value derived from the pseudo-Raleigh pulse arrival with a pseudo-Raleigh velocity data set.

78. A method according to claim 74, further comprising the step of calculating a correction factor to correct for error in effective spacing between receivers according to critical angle and formation velocity.

\* \* \* \* \*